(12) United States Patent
Warfield et al.

(10) Patent No.: US 10,979,383 B1
(45) Date of Patent: *Apr. 13, 2021

(54) SYSTEMS, METHODS AND DEVICES FOR INTEGRATING END-HOST AND NETWORK RESOURCES IN DISTRIBUTED MEMORY

(71) Applicant: OPEN INVENTION NETWORK LLC, Durham, NC (US)

(72) Inventors: Andrew Warfield, Vancouver (CA); Jacob Taylor Wires, Vancouver (CA); Daniel Stodden, Vancouver (CA); Dutch Meyer, Bellingham, WA (US); Jean Maurice Guy Guyader, Vancouver (CA); Keir Fraser, Cambridge (GB); Timothy John Deegan, Cambridge (GB); Brendan Anthony Cully, Vancouver (CA); Christopher Clark, Tigard, OR (US); Kevin Jamieson, Vancouver (CA); Geoffrey Lefebvre, Montreal (CA)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,942

(22) Filed: Jul. 2, 2019

Related U.S. Application Data

(63) Continuation of application No. 15/205,374, filed on Jul. 8, 2016, now Pat. No. 10,341,285, which is a
(Continued)

(51) Int. Cl.
*G06F 15/173* (2006.01)
*H04L 29/12* (2006.01)
(Continued)

(52) U.S. Cl.
CPC ...... *H04L 61/103* (2013.01); *G06F 15/17331* (2013.01); *G06F 16/134* (2019.01);
(Continued)

(58) Field of Classification Search
CPC ............... H04L 61/103; H04L 61/2007; H04L 61/6086; H04L 41/12; H04L 45/74;
(Continued)

(56) References Cited

U.S. PATENT DOCUMENTS 7,394,756 B1  7/2008  Cook
7,546,354 B1  6/2009  Fan et al.
(Continued)

FOREIGN PATENT DOCUMENTS

WO       2013138587 A1    9/2013

OTHER PUBLICATIONS

Andersen et al., "Fawn: A Fast Array of Wimpy Nodes", Proceedings of the ACM SIGOPS 22nd Symposium on Operating Systems Principles (2009), SOSP '09, pp. 1-14.
(Continued)

*Primary Examiner* — Wing F Chan
*Assistant Examiner* — Joseph R Maniwang

(57) ABSTRACT

Systems, methods and devices for distributed memory management comprising a network component configured for network communication with one or more memory resources that store data and one or more consumer devices that use data, the network component comprising a switching device in operative communication with a mapping resource, wherein the mapping resource is configured to associate mappings between data addresses associated with memory requests from a consumer device relating to a data object and information relating to a storage location in the one or more memory resources associated with the data from the data object, wherein each data address has contained
(Continued)

therein identification information for identifying the data from the data object associated with that data address; and the switching device is configured to route memory requests based on the mappings.

20 Claims, 8 Drawing Sheets

Related U.S. Application Data continuation of application No. 13/890,850, filed on May 9, 2013, now Pat. No. 9,390,055.

(60) Provisional application No. 61/804,424, filed on Mar. 22, 2013, provisional application No. 61/790,124, filed on Mar. 15, 2013, provisional application No. 61/672,495, filed on Jul. 17, 2012.

(51) Int. Cl.
```
G06F 16/182      (2019.01)
G06F 16/25       (2019.01)
G06F 16/13       (2019.01)
H04L 12/24       (2006.01)
H04L 12/741      (2013.01)
H04L 29/08       (2006.01)
G06F 9/455       (2018.01)
```

(52) U.S. Cl.
CPC ........... *G06F 16/183* (2019.01); *G06F 16/25* (2019.01); *G06F 16/256* (2019.01); *H04L 41/12* (2013.01); *H04L 45/74* (2013.01); *H04L 61/2007* (2013.01); *H04L 67/1097* (2013.01); *G06F 9/45558* (2013.01); *G06F 2009/45595* (2013.01); *H04L 61/6086* (2013.01)

(58) Field of Classification Search
CPC ........... H04L 67/1097; G06F 15/17331; G06F 17/30094; G06F 17/30203; G06F 17/30557; G06F 17/30566; G06F 9/45558; G06F 2009/45595
USPC ........................................................ 709/213
See application file for complete search history.

(56) References Cited

U.S. PATENT DOCUMENTS

| | | | |
|---|---|---|---|
| 8,391,289 B1 | 3/2013 | Yalagandula et al. | |
| 8,396,895 B2 | 3/2013 | Miloushev et al. | |
| 8,402,246 B1 | 3/2013 | Iglesia | |
| 8,447,829 B1 | 5/2013 | Geller et al. | |
| 8,447,884 B1 | 5/2013 | Baumann | |
| 8,650,362 B2 | 2/2014 | Iglesia et al. | |
| 8,671,265 B2 | 3/2014 | Wright | |
| 8,682,916 B2 | 3/2014 | Wong et al. | |
| 8,719,488 B2 | 5/2014 | Maheshwari | |
| 8,788,788 B2 | 7/2014 | Colgrove et al. | |
| 8,793,467 B2 | 7/2014 | Colgrove et al. | |
| 8,806,160 B2 | 8/2014 | Colgrove et al. | |
| 8,868,825 B1 | 10/2014 | Hayes et al. | |
| 8,874,835 B1 | 10/2014 | Davis et al. | |
| 10,341,285 B2 * | 7/2019 | Warfield | H04L 61/103 |
| 2002/0176363 A1 | 11/2002 | Durinovic-Johri et al. | |
| 2003/0069939 A1 | 4/2003 | Russell | |
| 2005/0144172 A1 | 6/2005 | Kilian et al. | |
| 2006/0101130 A1 | 5/2006 | Adams et al. | |
| 2007/0033367 A1 | 2/2007 | Sakarda et al. | |
| 2009/0222548 A1 | 9/2009 | Dommety et al. | |
| 2010/0070978 A1 | 3/2010 | Chawla et al. | |
| 2011/0016467 A1 | 1/2011 | Kane | |
| 2011/0106769 A1 | 5/2011 | Baptist et al. | |
| 2011/0184993 A1 | 7/2011 | Chawla et al. | |
| 2011/0185292 A1 | 7/2011 | Chawla et al. | |
| 2011/0185355 A1 | 7/2011 | Chawla et al. | |
| 2011/0255544 A1 | 10/2011 | Chidambaram | |
| 2012/0011500 A1 | 1/2012 | Faraboschi et al. | |
| 2012/0110055 A1 | 5/2012 | Biljon et al. | |
| 2012/0257628 A1 | 10/2012 | Bu et al. | |
| 2012/0324035 A1 | 12/2012 | Cantu et al. | |
| 2013/0136126 A1 | 5/2013 | Wang et al. | |
| 2013/0151646 A1 | 6/2013 | Chidambaram et al. | |
| 2013/0262739 A1 | 10/2013 | Bennett et al. | |
| 2013/0275660 A1 | 10/2013 | Bennett | |
| 2014/0215155 A1 | 7/2014 | Miller et al. | |
| 2014/0351363 A1 | 11/2014 | Wright | |
| 2015/0003294 A1 | 1/2015 | Martini et al. | |
| 2015/0039907 A1 | 2/2015 | Bowden et al. | |

OTHER PUBLICATIONS

Balakrishnan, M. et al., "Corfu: A Shared Log Design for Flash Clusters", Proceedings of the 9th USENIX Conference on Networked Systems Design and Implementation (2012), NSDI '12.

Barhama et al., "Xen and the Art of Virtualization", Proceedings of the Nineteenth ACM Symposium on Operating Systems Principles (2003), SOSP '03, pp. 164-177.

Casado et al., "Sane: A Protection Architecture for Enterprise Networks", Proceedings of the 15th Conference on USENIX Security Symposium—vol. 15 (Berkeley, CA, USA, 2006), USENIX—SS'06, USENIX Association.

Casado et al., "Ethane: Taking Control of the Enterprise", In SIGCOMM Computer Comm. Rev (2007).

Caulfield et al., "Moneta: A High-performance Storage Array Architecture for Next-generation, Non-volatile Memories", Proceedings of the 2010 43rd Annual IEEE/ACM International Symposium on Microarchitecture (2010), MICRO '43, pp. 385-395.

Caulfield et al., "Providing Safe, User Space Access to Fast, Solid State Disks", Proceedings of the Seventeenth International Conference on Architectural Support for Programming Languages and Operating Systems (2012), ASPLOS XVIII, pp. 387-400.

Clements et al., "Decentralized Deduplication in SAN Cluster File Systems", Proceedings of the 2009 conference on USENIX Annual Technical Conference (Berkeley, CA, USA, 2009), USENIX '09, USENIX Association, pp. 8-8.

Engler "DPF: Fast, Flexible Message Demultiplexing using Dynamic Code Generation", Proceedings of the ACM SIGCOMM '96 Conference: Applications, Technologies, Architectures, and Protocol for Computer Communication (Stanford, California, Aug. 1996), pp. 53-59.

Engler et al., "Exokernel: An Operating System Architecture for Application-Level Resource Management", Proceedings of the Fifteenth ACM Symposium on Operating Systems Principles (1995), SOSP '95, pp. 251-266.

Fusion-io inc., ioDrive Octal Data Sheet, http://www.fusionio.com/data-sheets/iodrive-octal-data-sheet/.

Hansen et al., "Lithium: Virtual Machine Storage for the Cloud".

Hutchinson et al., "The x-Kernel: An Architecture for Implementing Network Protocols", IEEE Trans. Softw. Eng_ 17, 1 (Jan. 1991), 64-76.

Intel Solid-State Drive 910 series, http://www.intel.com/content/www/us/en/solid-state-drives/ssd-910-series-specification_htm I.

International Search Report of PCT/US2013/31319.

Karger et al., "Consistent Hashing and Random Trees: Distributed Caching Protocols for Relieving Hot Spots on the World Wide Web", Proceedings of the Twenty-Ninth Annual ACM Symposium on Theory of Computing (1997), STOC 97, pp. 654-663.

Kohler et al., "The Click Modular Router", ACM Trans. Comput. Syst. 18, 3 (Aug. 2000), 263-297.

Kounavis E. et al., "A Systematic Approach to Building High Performance Software-Based CRC Generators", Proceedings of the 10th IEEE Symposium on Computers and Communications (Jun. 2005), ISCC' 05, pp. 855-862.

(56) References Cited

OTHER PUBLICATIONS

Lee et al., "Petal: Distributed Virtual Disks", Proceedings of the Seventh International Conference on Architectural Support for Programming Languages and Operating Systems (1996), ASPLOS VII, pp. 84-92.
Linux Device-mapper Resource Page, http:/fsourceware.org/dm/.
Linux logical volume manager (L VM2) Resource Page, http:/fsourceware.org/lvm2/.
Macko et al., "Tracking Back References in a Write-Anywhere File System", Proceedings of the 8th USENIX Conference on File and Storage Technologies (Berkeley, CA, USA, 2010), FAST 'O, USENIX Association, pp. 2-2.
Madhavapeddy et al., "Unikernels: Library Operating Systems for the Cloud", Eighteenth International Conference on Architectural Support for Programming Languages and Operating Systems (ASPLOS 2013) (Mar. 2013).
Mellor et al., "So everyone's piling into PCIe flash: Here's a who's who guide", The Register (Mar. 2013).
Meyer et al., "Block Mason", Proceedings of the First Conference on 1/0 Virtualization (2008), WIOV '08, pp. 4-4.
Mosberger et al., "Making Paths Explicit in the Scout Operating System", Proceedings of the Second USENIX Symposium on Operating Systems Design and Implementation (1996), OSOi '96, pp. 153-167.
Thekkath et al., "A Scalable Distributed File System", Proceedings of the Sixteenth ACM Symposium on Operating System Principles (1997), SOSP '97, pp. 224-237.
VMware, http://vmware.com/.
Zhu et al., "Avoiding the Disk Bottleneck in the Data Domain Deduplication File System". Proceedings of the 6th USENIX Conference on File and Storage Technologies (Berkeley, CA, USA, 2008), FAST '08, USENIX Association, pp. 18:1-18:14.

\* cited by examiner

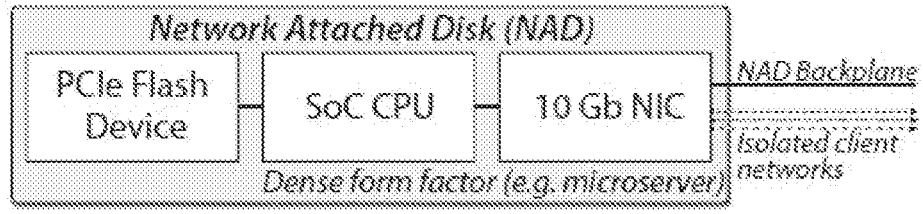
*Figure 5*
| | |
|---|---|
| create | create an object |
| delete*(object)* | delete an object |
| read*(object, offset, length)* | read *length* bytes from *object* starting at *offset* |
| write*(object, offset, length)* | write *length* bytes from *object* starting at *offset* |
| trim*(object, offset, length)* | release *length* bytes from *object* starting at *offset* |
| resync*(object)* | |
*Figure 6*
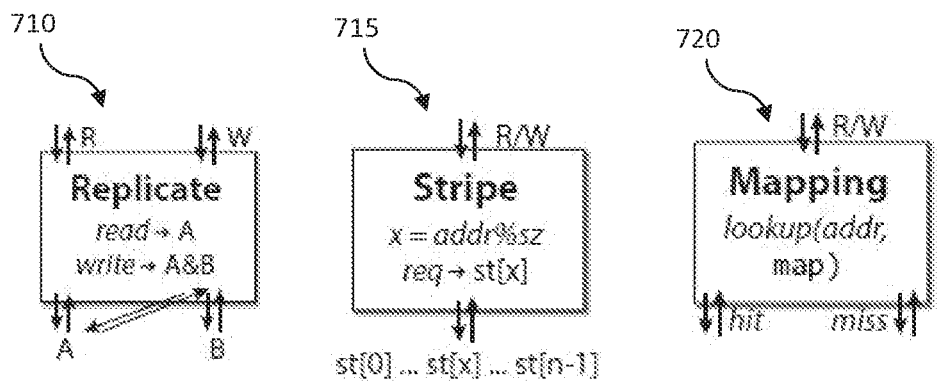
*Figure 7*

```
On failure of NAD NADid:
disconnect_data_VLAN(NADid);
oid_list = SELECT oid FROM OID_records[]
           WHERE (oid.type == Replicate)
             AND (oid.targets contains NADid);
for x in oid_list:
   new_target = find_new_replica_NAD(x.targets);
   x.targets.remove(NADid);
   n = x.targets[0];
   prio = x.targets.count();
   t = new_task {
          n.sync(oid, new_target);
          x.targets.add(new_target);
          notify_dispatch_reload(oid);
      }
   schedule_task(t, PRIO_REBUILD + prio);
```

*Figure 10*

```
for hint in hintfile:

if not (tblentry = hint_in_table(hint)):
     add_to_table(hint);   #Hash not seen yet
     continue;

if not data_in_arena(tblentry):
     move_to_arena(tblentry);    #Seen twice

#Transaction watches for client update
   transid = map_watch(hint);
   if not same_data(hint, tblentry):
     map_transaction_abort(transid);
     continue;               #Hash collision mysql_add_backptr(hint);   #For dedup GC
   tblentry.refcnt++;         #For dedup GC
   map_update_and_trim(hint, tblentry);
   map_trans_commit(transid);         #Done
```

*Figure 11*

SYSTEMS, METHODS AND DEVICES FOR INTEGRATING END-HOST AND NETWORK RESOURCES IN DISTRIBUTED MEMORY

FIELD OF THE INVENTION

The present invention relates to systems, methods and devices for integrating end-host and network resources in the design of a low-latency persistent distributed memory.

BACKGROUND

Enterprise storage systems are expected to keep data safe, and allow it to be accessed with excellent performance characteristics. This is a well explored problem space, and today many large corporations make their business out of selling hardware that stores data. Despite the relatively established nature of storage technology, remarkably fewer approaches have been explored in the design of storage systems.

Data storage in network environments has traditionally been designed in one of two ways: the dominant approach is to have a single, shared server (often called a target or array) that houses a bunch of persistent memory (disks or flash) and presents it over a network connection using a protocol such as NFS or iSCSI. A secondary, and less popular, approach is called "distributed storage" (or sometimes "clustered storage") in which many network connected devices collaborate to provide storage functionality.

The centralized approach used in the first class is appealing because it is easier to build and reason about, however, it also suffers from challenges in achieving very high performance because a single device must scale to handle a very high rate of requests.

The second approach has potential benefits in terms of both performance and cost: many lower-cost storage targets may federate to provide a higher aggregate level of performance than can be achieved on a single server. Unfortunately, distributed storage presents problems in multiple areas. A large class of problems in distributed storage is that system-wide state (such as where the current and correct version of a piece of data is located) and system-wide decisions (such as whether a device has failed and how to recover) end up being distributed and involve a great deal of complexity of design and implementation in order to match the functionality of a centralized solution.

By and large, the design of enterprise storage is treated much like the design of any other software server: A piece of software is written to handle read and write requests, and this software is deployed on one or more end hosts. In some cases, these end hosts are actually sold, as a package, including the storage server software. Three common approaches to this design are summarized as belonging to Monolithic Storage Devices, Clustered or Parallel File and Storage Systems, and Peer-to-Peer or Overlay Network-based Storage.

Monolithic storage devices, often known as "Filers" (in the case of file-level protocols such as CIFS and NFS), "Arrays" (in the case of block level protocols such as iSCSI or Fiber Channel), or more generally as "Storage Targets", are generally single physical devices that contain disks and computing capabilities, attach to an enterprise network, and store data. In this model a vendor tightly couples the storage server software with the specific hardware that it will be packaged on and sells the entire unit as a package. Popular examples here include NFS servers from Network Appliance, or arrays from EMC, HP, or IBM.

In clustered or parallel file and storage systems, the storage software is spread across many physical devices. Systems typically divide responsibility between a small, important number of very important hosts that handle control messages and requests for important, highly contended data, and a second class of servers that just store data. The first tier of servers is often referred to, in the case of clustered file systems, as metadata servers. Clustered systems may be packaged completely as software as is the case with systems such as Lustre, Glustre, CLVM, or the Google File System or as hardware, such as Panasas, Isilon, or iBricks.

Some more recent systems have explored peer-to-peer style storage, or overlay network-based storage, in which a collection of individual devices achieve some degree of self-organization by dividing a large virtual storage address space among themselves. These systems often use Distributed Hash Tables (DHTs) and the application of hash functions to either data or data addresses in order to distribute data over a large collection of hosts in order to achieve scalability. Examples of these systems include file systems such as Ceph, Corfu, and the Fast Array of Wimpy Nodes (FAWN) prototypes, which combine purpose-designed hardware and software.

These classifications are not meant to perfectly taxonomize storage systems, but rather to show that while a number of approaches have been taken to the construction of storage systems, they have all been implemented effectively as software server applications that may or may not include end server hardware. As such, these designs all hinge on the fact that logic in the end systems is where enterprise storage should be implemented. They are designed with the assumption that relatively simple and general purpose underlying networks (even storage specific networks such as fibre channel) are sufficient to build reliable, high-performance storage.

Although it is possible to construct a very high performance monolithic storage system with a great deal of bandwidth and fairly low latency, it is difficult for such a system to compete with the latency and bandwidth of local device buses on modern hardware, such as PCIe. In approaches described herein, resources may be provisioned on the host for the best possible performance, while still providing availability (location transparency, replication). Disclosed systems make efficient uses of resources that are already present (fast storage, switching, and host bandwidth, CPU) to provide a high-performance storage target at much lower cost than a dedicated monolithic appliance. Further, monolithic storage systems invariably add an unnecessary bottleneck to the design of networked storage systems. Where a single end system (the storage target) is required to serve request traffic from multiple clients, it must scale in performance in order to satisfy the demands of that request load. Scaling a single end system in this manner is challenging for a number of reasons, including (as only a few simple examples) both bandwidth of network connections to the collection of clients, bandwidth and latency of access to its local persistent storage devices, CPU and memory demands in order to process and issue individual request traffic.

Recent years have seen a fundamental set of changes to the technical capabilities of enterprise computing: In particular: (a) non-volatile memories, such as Flash-based technologies have become fast, inexpensive, and connected directly to individual computers over high-speed busses such as PCIe; (b) Server CPUs have become increasingly parallel, often possessing additional cores that may be dedicated to the management of specific devices such as network interfaces or disks, these core may directly manage a subset of PCIe devices on a system; (c) network switching hardware has become faster, more capable, and more extensible.

Projects such as OpenFlow, and Commercial products, including Arista Networks' Extensible Operating System (EOS) allow new, software-based functionality to be pushed onto the network forwarding path. All three of these factors characterize commodity hardware, and reflect trends that will increase in the years to come.

It is no longer sensible to think of storage architectures as systems that are implemented on end hosts at the other end of the network from the applications that consume them. It is also no longer sensible to consider high-performance storage as an application server that is implemented above a general-purpose network. These assumptions are common in virtually all storage systems that are designed and sold today, and do not reflect the realities of emerging hardware.

In distributed storage systems, it is assumed that all participants of the system are effectively independent, and may communicate with each other in arbitrary manners. As a result, in the event of a loss of connection to a small number of nodes, it is hard to disambiguate between the case where those nodes have all simultaneously failed, and the case where the network has become partitioned, leaving those nodes alive, but unable to communicate with the rest of the system. Similarly, a decision to move a piece of data stored on one node to reside on another typically requires that all nodes "agree" and that there is no cached state that might result in a node reading or writing a stale copy of that piece of data.

Known distributed memory systems access data over networks, and maintain some relationship between data addresses and network addresses. In NFS and SMB, for instance, a file is located at "server_address:/mount/point/file_name.ext". Block-level protocols such as iSCSI use similar techniques. Some research systems, for instance the Chord DHT, FAWN, and Microsoft's Flat Datacenter Storage (FDS) use a hash function to map a data address onto a specific network host address. For example, a list of n hosts might be stored in a table, and then when accessing a specific piece of data, the host performing the access would calculate:

destination table index=hash_function(data address) modulo $n$

This methodology results in the hash function evenly, but semi-randomly, distributing load over the hosts in the table. In these cases, requests are still sent specifically to end hosts, leading to considerable complexity in activities such as (a) adding or removing hosts from the cluster, (b) responding to the failure of individual hosts, (c) moving specific pieces of data, for instance to rebalance load in the face of hot spots.

In known network switches, deciding where to send writes in order to distribute load in a distributed system has been challenging; techniques such as uniform hashing have been used to approximate load balancing. In all of these solutions, requests have to pass through a dumb switch which has no information relating to the distributed resources available to it and, moreover, complex logic to support routing, replication, and load-balancing becomes very difficult since the various memory resources must work in concert to some degree to understand where data is and how it has been treated by other memory resources in the distributed hosts.

Storage may be considered to be increasingly both expensive and underutilized. PCIe flash memories are available from numerous hardware vendors and range in random access performance from about 50K to about 1M Input/Output Operations per Second ("TOPS"). At 50K TOPS, a single flash device consumes 25 W and has comparable random access performance to an aggregate of 250 15K enterprise-class SAS hard disks that consume 10 W each. In enterprise environments, the hardware cost and performance characteristics of these "Storage-Class Memories" associated with distributed environments may be problematic. Few applications produce sufficient continuous load as to entirely utilize a single device, and multiple devices must be combined to achieve redundancy. Unfortunately, the performance of these memories defies traditional "array" form factors, because, unlike spinning disks, even a single card is capable of saturating a 10 Gb network interface, and may require significant CPU resources to operate at that speed. While promising results have been achieved in aggregating a distributed set of nonvolatile memories into distributed data structures, these systems have focused on specific workloads and interfaces, such as KV stores or shared logs, and assumed a single global domain of trust. Enterprise environments have multiple tenants and require support for legacy storage protocols such as iSCSI and NFS. The problem presented by aspects of storage class memory may be considered similar to that experienced with enterprise servers: Server hardware was often idle, and environments hosted large numbers of inflexible, unchangeable OS and application stacks. Hardware virtualization decoupled the entire software stack from the hardware that it ran on, allowing existing applications to more densely share physical resources, while also enabling entirely new software systems to be deployed alongside incumbent application stacks.

Therefore, a solution that achieves the cost and performance benefits of distributed storage, without incurring the associated complexity of existing distributed storage systems is desirable.

The examples and objectives described above are included solely to advance the understanding of the subject matter described herein and are not intended in any way to limit the invention to aspects that are in accordance with the examples or improvements described above.

SUMMARY OF INVENTION

The present invention is directed to systems, methods and devices for storage and management of data on distributed storage systems.

In one aspect of the subject matter disclosed herein, there are provided A distributed memory device comprising a network component configured for network communication with one or more memory resources that store data and one or more consumer devices that use data, the network component comprising a switching device in operative communication with a mapping resource, wherein the mapping resource is configured to associate mappings between data addresses relating to data from a data object and information relating to one or more storage locations in the one or more memory resources associated with the data from the data object, wherein each data address has contained therein identification information for identifying the data from the data object associated with that data address; and the switching device is configured to route memory requests based on the mapping of the of the data address associated with said memory resource received from the mapping resource.

In some aspects, there are provided distributed memory systems for one or more data objects comprising a network component configured for network communication with one or more memory resources and one or more consumer devices, the network component comprising a switching device in operative communication with a mapping resource, wherein the mapping resource is configured to associate mappings between data addresses associated with data from a data object and information relating to a storage location, wherein each data address has contained therein identification information for identifying the data from the particular data object associated with that data address, and the switching device is configured to receive routing information from the mapping resource based on the mappings the one or more consumer devices are configured to generate the data addresses, encode identifying information related to data from a data object, and embed the encoded identifying information in data addresses; and the one or more memory resources are configured to store the data from one or more data objects in storage locations in accordance with the associations in the mapping resource.

In some aspects, there are provided methods for using and storing data objects across distributed memory resources over a network, the method comprising the steps:

generating a data address at a consumer device, the data address comprising at least a portion that contains encoded information that identifies a portion of data in one of the data objects;

sending memory requests relating to the portion of data over the network to a network component, wherein addressing information of the memory request comprises the data address;

receiving the memory request at the network component and checking to see if the data address has been mapped to information relating to a storage location in the distributed memory resources in a mapping resource that is communicatively coupled to the network component;

if the data address has been mapped to information relating to a storage location in the mapping resource, forwarding the memory request to that storage location mapped to the data address, else forwarding the memory request to the distributed memory resources in accordance with a routing methodology.

In some aspects of the instantly disclosed subject matter, all of the distributed hosts communicate using a shared network. Rather than treating the implementation of the system as a collection of addressable hosts each serving some subset of data, as in conventional distributed memory systems, aspects of the instantly disclosed system treat the system as a set of directly addressable data that uses existing network-based protocols, abstractions and infrastructure to map data directly on to network primitives. This permits the use of functionality on conventional network switches to coordinate responses to failure of hosts, data migration between hosts, and related challenges. Put simply, by putting data addressing functionality onto network protocols, the network itself can effectively centralize the challenging aspects of distributed storage at a single network component.

In aspects described herein, there are architectures and designs of storage systems that incorporate and integrate software on both end hosts (to manage locally attached storage, such as PCIe flash devices) and on network switches that permits the complex logic involved in storage implementations, such as where to store data and how to achieve redundancy, to be placed in the specific hardware components where that logic can most effectively be implemented and acted upon. In some aspects, end-hosts and network switches may not require software. For example, in some cases the subject matter described herein may leverage existing network infrastructure on switches by using pre-existing address forwarding protocols or by allowing end-hosts to handle requests according to pre-existing storage policies and protocols. In some aspects, software to implement the functionalities described herein may be required at some or all of the consumer devices, network component or storage resources.

The approach described in some disclosed aspects utilizes modified network interconnects (e.g. an Ethernet switch) that may be necessary in network storage systems. These are often a "choke point" in terms of both performance and failure management. Rather than adding an additional such point, as is the case in monolithic storage servers, instantly disclosed aspects utilize performance-sensitive logic for the processing, and forwarding of storage requests directly on the network data path at such a switch, and thus allow requests to be distributed across multiple end systems, each offering a relatively simple interface to accessing data on its local disks.

Whereas prior distributed systems approximate storage-specific request forwarding by implementing an overlay, or peer-to-peer architecture within software on the participating end systems, aspects disclosed herein provide lower latency and higher throughput by routing storage requests directly within the network (e.g. on the interconnect, on network interfaces in end systems, or otherwise) to whichever host can best satisfy the request (according to metrics such as response latency, power consumption, data availability, etc.). For example, low latency and high-throughput storage is achieved in aspects of the instantly disclosed subject matter by directly monitoring each host's request queue rather than randomly distributing writes or using old information that may handle bursty traffic poorly.

Approaches described herein in some aspects relate to the use of distributed shared memory and specifically that a network-based approach can be used to address data across all memory storage locations and that the unification of that addressing can be used to manage the placement of data over time, responding to performance and failure concerns as they arise.

Aspects of the instantly disclosed subject matter may be utilized to build a scalable storage system. Rather than building distributed memory resources in a manner that has generally been achieved with storage arrays in the past, where a computer system manages a large number of connected disks over an internal device bus, aspects of the instantly disclosed subject matter use commodity network technologies (e.g. Ethernet) as an interconnect, and thus allows the system to be extended by adding additional nodes on the network.

In general, aspects of the subject matter disclosed herein attempt to strike a balance between two opposing realities: First, in order to capitalize on device performance, clients (i.e. consumer devices) should have access to network attached storage devices (i.e. memory resources) and the freedom to deploy application-specific distributed storage stacks on top of them. Second, it is desirable for memory resources to be shared, in an isolated manner, between multiple concurrent consumer devices within the datacenter environment. The approach used in prior storage system designs is to first aggregate a collection of devices into a single, unified addressable structure and then treating the problem of subdividing and specializing this aggregate as a higher-layer problem. To balance these two, aspects described herein utilize resource partitioning techniques that have been used in operating system and virtual design, particularly for the management of CPU and memory resources: Given a set of network-attached storage devices that is to be shared concurrently by multiple independent clients, we begin with device-level interfaces to achieve per-client isolation, and then tackle the systems problems of building useful aggregate storage systems above this on a per-tenant basis.

Some aspects described herein utilize some or all of the following three concepts:

(1) They may export sparse address spaces on network attached storage devices as a basis for establishing controlled sharing. Virtualizating the storage address space at the device itself allows multiple clients to each have the illusion of their own isolated "slice" of each storage device and allows them to issue requests directly, rather than through an intermediary. It also provides an appropriate point to incorporate hardware-level virtualization support (e.g., object-level SSD APIs, NIC multiqueue, and SR-IOV) and network isolation techniques like VLANs or OpenFlow rules to map clients to specific, isolated storage resources; (2) They implement the storage data path as a set of efficient, stackable address translation layers that are decoupled from individual storage devices. Aspects may take a "libOS" approach of allowing clients to compose the specific storage features that they require from a set of common facilities such as striping and layering. Implementing the storage data path as a dispatch layer that is decoupled from device management means that it may be placed appropriately: common components may be used to integrate directly with application code and to build a clustered NFS server. While these modules are reusable, they are not prescriptive: clients may opt to deploy software directly against device address spaces; and (3) They provide defensive, opt-in coordination interfaces that can be used to build shared storage functionality wherever it is desirable. Storage clients benefit from functionality such as failure detection and recovery, and space efficiency through deduplication. We provide a set of coordination APIs that allow shared services like these to be built and used by clients where desired without subjecting all clients to them. These interfaces tolerate misbehaving clients by being designed in manner that only allows clients to put their own data at risk.

Aspects disclosed herein may consist of an enterprise storage system that applies these three ideas to achieve high-performance, controlled sharing of network attached non-volatile memory resources in enterprise environments. They may include an embedded software stack that runs co-located with each storage device to present it as a Network Attached Disk (NAD). NADs are registered with a fault-tolerant cluster coordination service that tracks storage consumption and accounts it to a set of registered storage clients, which are end consumers of NAD-based resources. Clients use our dispatch interface to compose storage paths, allowing them to combine individual device resources into striped, replicated storage aggregates.

The examples and objectives described above are included solely to advance the understanding of the subject matter described herein and are not intended in any way to limit the invention to aspects that are in accordance with the examples or improvements described above.

BRIEF DESCRIPTION OF THE FIGURES

The invention, both as to its arrangement and method of operation, together with further aspects and advantages thereof, as would be understood by a person skilled in the art of the instant invention, may be best understood and otherwise become apparent by reference to the accompanying schematic and graphical representations in light of the brief but detailed description hereafter:

FIG. 5 shows an exemplary network attached disk ("NAD").

FIG. 6 shows exemplary NAD object interface code.

FIG. 7 shows exemplary processor methodologies.

FIG. 10 shows exemplary code for replication.

FIG. 11 shows exemplary code for de-duplication.

DETAILED DESCRIPTION OF THE INVENTION

Figure 1:
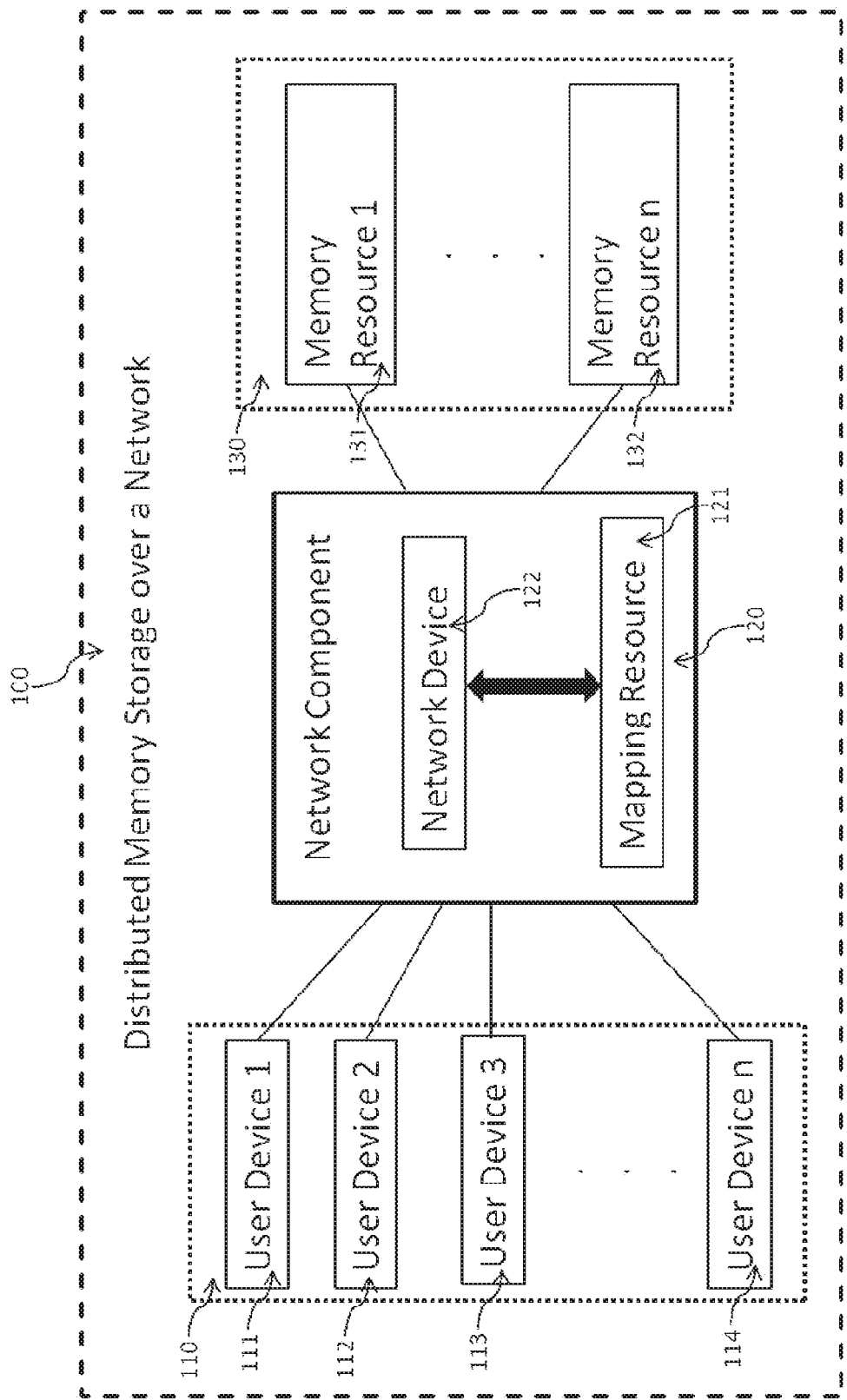
FIG. 1 is a high-level depiction of the association between components of the instantly described subject matter.

The present invention will now be described more fully with reference to the accompanying schematic and graphical representations in which representative aspects of the present invention are shown. The invention may however be embodied and applied and used in different forms and should not be construed as being limited to the exemplary aspects set forth herein. Rather, these aspects are provided so that this application will be understood in illustration and brief explanation in order to convey the true scope of the invention to those skilled in the art. Some of the illustrations include detailed explanation of operation of the present invention and as such should be limited thereto.

As used herein, the term "virtual," as used in the context of computing devices, may refer to one or more computing hardware or software resources that, while offering some or all of the characteristics of an actual hardware or software resource to the end user, is a simulation of such a physical hardware or software resource. Virtualization is the process of, or means for, instantiating simulated or virtual computing elements such as, inter alia, hardware platforms, operating systems, memory resources, network resources, or any hardware resource, software resource, interfaces, protocols, or other element that would be understood as being capable of being rendered virtual by a worker skilled in the art of virtualization. Virtualization can sometimes be understood as abstracting the physical characteristics of a computing platform or device from users or other computing devices or networks, and instead providing access to an abstract equivalent for the users, other computers or networks, sometimes embodied as a data object or image recorded on a computer readable medium. The term "physical," as used in the context of computing devices, may refer to actual or physical computing elements (as opposed to virtualized abstractions of same).

As used herein, a "consumer device" may refer to any computing device that is utilized by an end-user that may require the use of memory resources for carrying out computing functions. It may be referred to herein as a client or an end user device. It may refer to the computing device that is the source or originator for memory requests (i.e. read, write or update requests).

A "computing device" may include virtual or physical computing device, and also refers to any device capable of receiving and/or storing and/or processing and/or providing computer readable instructions or information. It may include virtual and/or physical computing device, and also refer may refer to any device capable of receiving and/or transmitting and/or storing and/or processing and/or providing computer readable instructions or information. This may include any general purpose computer, any hand-held device, any processing device, microcontroller or any combination thereof. The computing device may also refer to any device that may be communicatively coupled to any network as would be known to a worker skilled in the art.

A "memory resource" can be any computing device containing or comprising a memory component, or an element or portion thereof, that is used or available to be used for information storage and retrieval. Memory, as used herein, can refer to any of the components, resources, media, or combination thereof, that retain data, including what may be historically referred to as primary (or internal or main memory due to its direct link to a computer processor component), secondary (external or auxiliary as it is not always directly accessible by the computer processor component) and tertiary storage, either alone or in combination, although not limited to these characterizations. Although the term "storage" and "memory" may sometimes carry different meaning, they may in some cases be used interchangeably herein. Memory resources may be physical and/or virtual in nature. A virtual memory resource may refer to a virtualization of any one or more memory resources configured to simulate or be an abstraction of one or more available physical memory resources across one or more physical memory components as a single memory component. This may be achieved in some aspects by combining fragmented or distributed physical memory resources. The physical memory resources may be the same or different types of resources, including memory resources that provide rapid and/or temporary data storage, such as RAM (Random Access Memory), SRAM (Static Random Access Memory), DRAM (Dynamic Random Access Memory), SDRAM (Synchronous Dynamic Random Access Memory), CAM (Content-Addressable Memory), or other rapid-access memory, or more longer-term data storage that may or may not provide for rapid access, use and/or storage, such as a hard disk drive, flash drive, optical drive, SSD, other flash-based memory, PCM (Phase change memory), or equivalent. Other memory resources may include uArrays, Network-Attached Disks and SAN. A given virtual memory resource may thus include, in whole or in part, virtualized volatile memory devices, non-volatile memory devices, or both volatile and non-volatile memory devices acting in concert, flash-based memory and PCM (phase change memory). Virtual memory resources may or may not adopt the same characteristics of the physical memory resources to which they are associated. For the purposes of the subject matter disclosed herein, a memory resource may also include any future unforeseen storage devices that may be developed for storing data. A memory resource may be the same computing device as the consumer device, such as when the consumer device comprises local storage that may be used for data objects associated with such consumer device.

A "switching device" refers in general to any device resident on a network that that links network segments or network devices. As used herein, it may refer to a multi-port network bridge that processes and routes data between devices on a network. Switches exist for various types of networks including Fibre Channel, Asynchronous Transfer Mode, InfiniBand, Ethernet and others. A switch is a telecommunication device that receives a message from any device connected to it and then transmits the message to the device for which the message was meant, or in some cases to other devices that are capable of determining the device for which the message was meant. A switching device may be used in a virtual and/or a physical environment. Furthermore, a switching device may also include software provisions for custom programmability, network virtualization, simplified architectures, automated monitoring/management, etc.

A "network component" comprises a network switch and a mapping resource. The network switch and mapping resource may reside in the same or different physical components, provided that they are communicatively coupled. The network switch in this network component can be configured to operate in a similar manner to conventional switches, in that it directs data traffic across network resources and that it uses address forwarding protocols to direct data traffic when the appropriate destination of that data has not yet been determined or is not "known" by the switch. It has additional functionality, which may be in accordance with instructions provided by software running on the switch (or on other devices that are connected to it), which permits the switch to receive routing information regarding a specific piece of data from a mapping resource that forms part of the network component. In this way, the network switch in a network component does not need to maintain its own lookup table for routing data, but rather is instructed, either by the mapping resource or, should the system wish to rely on existing network infrastructure and functionality, by existing address forwarding protocols, on where to direct memory requests.

As used herein, "NAD" is a network attached device that provides network-attached storage (NAS) and which provides a dedicated memory storage device, such as but not limited to a hard disk drive or SSD, that is set up with its own network address and provides data storage services to other devices on the network. A network-attached storage device may be attached to a local area network and assigned an address, such as an IP address or a MAC address. NADs may consists of hard disk storage, including multi-disk RAID systems. Software for NADs can usually handle a number of network protocols, including Microsoft's Internetwork Packet Exchange and NetBEUI, Novell's Netware Internetwork Packet Exchange, and Sun Microsystems' Network File System. Although some NADs will run a standard operating system like Windows, many NADs run their own proprietary operating system. For example, the network attached storage platforms from NetApp use the company's proprietary Data ONTAP operating system.

A "mapping resource" is a resource that associates mappings between data addresses and information that relates to a storage location. The mappings may be static associations between data addresses and storage locations (or information relating thereto); the mappings may also comprise of a mapping scheme for determining with which storage locations a data address or data address comprising a given prefix or portion the data address should be associated. The mapping resource can also change the mappings depending on characteristics of the data relating to the data addresses, of the network or networks, of the end hosts in the distributed memory resources, of the consumer devices, or the end-user of the consumer devices. The mapping resource may, in some aspects, provide a centralized reference, such as a look up table, for recording and managing where specific data associated with data addresses are or should be stored. The mappings may be static associations between data addresses and information relating to storage locations, but may also be dynamic and include policies and functionalities that map ranges or classes of data addresses, which may be identified by such data addresses having certain prefixes (or suffixes) or other characteristics, according to a mapping scheme. For example, if a mapping resource may map those data addresses that comprise a portion that falls within a predetermined range to memory resources according to a hash function, round-robin assignment, striping of chunks, or by sending such data addresses to the memory resource that best meets operational objectives (as may be determined by received operational characteristics at the time of forwarding the request), such as sending to the memory resource having the shortest queue for memory requests pertaining to a particular object, or to the class of memory resources having the lowest failure rate for all data originating from a class of end users that require safe storage of sensitive data.

"Memory requests" or "memory instructions" as used herein may refer to any requests or instructions for reading data from, accessing data from, writing data to, updating data on or otherwise using data on memory resources.

The instantly disclosed subject matter consists of methods, systems and devices for managing distributed memory resources for the use and storage of data and data objects that may be created, accessed or otherwise used by one or more consumer devices and/or end-users of such consumer devices. In some aspects, an exemplary device comprises a network component configured for network communication with one or more memory resources that store data and one or more consumer devices that use data. The network component comprises a switching device in operative communication with a mapping resource, wherein the mapping resource is configured to maintain mappings between: (i) data addresses associated with data from a particular data object and (ii) information relating to a storage location in the one or more memory resources associated with the data from the particular data object. The data addresses of the instantly disclosed subject matter is configured to have contained therein identification information for identifying the data from the particular data object associated with that data address. The switching device is configured to receive routing information from the mapping resource based on the mappings, while it may rely on address forwarding protocols in cases where the mapping resource has no mapping for a particular data address or, alternatively, the system has at a given point in time or for specific data decided to rely on the network for forwarding memory requests.

In one aspect, there is provided a clustered NFS server for VMware ESX. On a single 48-port 10 Gb switch, this aspect is capable of delivering 1M random TOPS to a set of 80 load-generating I/O-intensive virtual machines, at an aggregate throughput of 20 GB/s. Such aspect may have implemented thereon replication, striping, and deduplication as composable layers in the system. This approach allows new NADs to be added incrementally, with an associated improvement in aggregate performance and latency.

In operation, aspects can operate in accordance with the following. A range of data addresses are made available for use by a consumer device. In some cases, this range is made available by the network component and in other cases the consumer device is limited only by the addressing protocol or convention with respect to the range of addresses that may be used. The consumer device may create or generate any data address from within this range to designate for memory requests relating to a give data. The consumer device is configured to create the data address in accordance with a communication protocol or a convention to both: (a) build identifying information that can be used to relate to or identify a specific portion of data, such as a data object or a particular byte or a range of bytes in a particular data object; and (b) create a data address for that specific portion of data that includes within such data address the identifying information relating to the portion of data. The consumer device in this example will send a data packet in respect of a given portion of data with the data address included in its destination field. The network component will receive a packet with the data address included in its destination field and, the switch will route that packet, after determining routing information from information contained in the mapping resource, to the memory resource that is or will be associated with that data address in the mapping resource. In cases where there is no mapping associated with the data address (because, for example, it is a new data address for data that has not been stored or accessed by the consumer devices), the network component may be configured to forward the packet associated with the data address according to a forwarding protocol, which may be based on information in the data address or other operational characteristics, or, alternatively, according to address forwarding protocols or other policies that are well understood in the art to determine where the data will be or is stored. In such cases, once the network switch of the network component has resolved the destination of the data packet, information relating to the storage location may be mapped to the data address in the mapping resource, if the mapping is static, or the mapping resource may simply keep track of the mapping scheme that it used for mapping the data.

The mapping resource, for example, associates data addresses with the MAC addresses of the memory resources that are connected, via a network, to the network component. In aspects, the mapping resource may associate data addresses with varying degrees of granularity. In some aspects, the mapping resource can map data addresses to specific resources (e.g. a drive or SSD, within a memory resource), a specific location within any such specific resource (e.g. a specific location on a drive or SSD), or a communication port that handles traffic to multiple memory resources on a segment communicatively coupled to that port (and which, for example, may rely on address forwarding protocols or other user-implemented policies on hubs and or switches residing on the network in order to forward data packets to the correct memory resource). Furthermore, the mapping resource is configured to receive or obtain information relating to computing or network devices on the network. Such information may comprise characteristics relating to the type, status or nature of any of: the consumer device, the data or data objects that are being sent over the network, the end user, the networks or network segments over which the data is being sent, and the memory resources. The mapping resource is configured to manage the mappings between the data addresses and the information relating to the storage locations in response to these characteristics and/or a pre-determined policy to achieve some objective relating to the usage of the data. In aspects, real-time changes to the mappings will result in a centralized management of where and how data is stored over distributed memory resources. The network switch on the network component directs the data to the storage location indicated in the mapping resource and as such the network component manages the storage locations for data.

The memory resources comprise of one or more memory storage resources that are connected via a communication network. Upon receipt of data packets from the network component, the appropriate memory resource may store the data in accordance with known methodologies. In aspects, the memory resource receiving the memory request (i.e. a read, write, or update) obtains information relating to the identity of the data associated with the request by decoding that information encoded in the data address (or in some aspects, some information, such as the offset within the data object associated with the data, from header information in the payload) and utilizes that information to determine where (a) the requested data is stored (in the case of a read) or (b) the data should be stored, and then keep track such information in its internal file system information. The memory resource may be configured to decode this information by pre-loading the memory resource with software; among other things, this software may in some aspects provide the appropriate convention to the memory resource thus enabling it to recognize and decode the data-identifying information from the data address associated with a memory request. Data that is returned responsive to a read request may be located by the file system of the memory resource utilizing the information the encoded information, and then is sent back to the requesting consumer device using the source address that accompanied the data packet associated with the read request. An acknowledgement may occur for write requests to confirm that the write occurred.

In some aspects, consumer devices may have local storage for data. The use of the local storage may supersede the use of the distributed memory resources and the consumer device may override the use of the network component and instead choose to use local storage resources. In some cases, this may be used when low-latency or high speed and frequent memory requests are initiated. In some aspects, the local storage resources may be integrated into the distributed memory resources and be addressable by the mapping resource. A consumer device, in some aspects, may in some cases also be a memory resource.

In some aspects, the generation of data addresses by consumer devices is, at least in part, by convention. There are many examples of client applications that could conceivable generate data addresses, including but not limited to file systems, databases, key/value stores. While the data address is, in many cases, an IP address, the instant subject matter uses portions of the IP address to carry information. In other words, portions of the data address, which are utilized by network resources to identify a destination, are manipulated to also refer to information that identifies the specific portion of data that is associated with the data address. In such cases, the data address is analogous to a disk: a disk lets you issue reads or writes at an arbitrary location, and since any valid data addresses may be generated (provided they are within a given range of data addresses that are in accordance with acceptable protocols) that may carry information in accordance with a convention. This information, while recognized by existing network infrastructures in an exemplary aspect as an IP address (or a destination field), can also be recognized by the consumer device, network component, and/or the memory resources as information that can be unpacked to identify the portion of data in question. By using the analogue of a disk to the IP address, the following illustrative example can be used to understand the how information is carried by the data address: valid locations of a data object start at 0 and increase in number to the size of the disk (in this case, the appropriate field of the IP address). An exemplary 1 TB disk would allow the issuance of read and write requests to any address from 0 up to about 1,000,000,000,000. The disk can be instructed to write the value 18 at location 9,900, which would involve finding the 9,900th byte of the disk and setting it to 18. This address space for the disk in this illustrative example may be described as linear and non-virtualized, wherein each address is a physical location on the device. Using this analog in aspects of the instant invention, the mapping resource can be seen as allowing arbitrary indirection between the data address generated at the consumer device and another. It can map a data address A to a location B, where B is the endpoint on the network that is currently responsible for providing the data relating to A, and therefore information carried by the data address can be used in different ways, including to identify the portion of data to which the data address is related.

Extending the exemplary hypothetical disk example above to a data address, the data address can be thought of as a disk that is much smaller than the 1 TB imagined above. Rather, it can, for example, store 1000 bytes, with addresses from 0 to 9999. The network component, or in alternative aspects, the memory resources themselves, offer up a range of data addresses for use by a consumer device. In this example, the memory resources comprise of three servers (x, y and z) that each offer up one disk. In this exemplary convention, the system permits the generation of 4-digit data addresses for which the mapping resource determines (or dynamically "maps") addresses from 0000 to 0999 refer to server x, 1000 to 1999 refer to server y, and 2000 to 9999 refer to server z. The mappings, in this simple example, are prefix based. The address 0000 is on server x, 1001 is on server y and any four-digit address from 2000 to 9999 is on z in accordance with the mapping in the mapping resource, but the mapping resource may, depending on operational characteristics of the system, or a change in policy objectives, may re-map the addresses to the servers (or indeed additional servers) in an alternative manner. In the above example, provided for illustrative purposes, data addresses are analogized as addresses to a disk, in that they talk about an address where a piece of data lives. They can be used to read or write data as if you were talking to a disk. Due to the arbitrary mapping of the data addresses to storage locations on the mapping resource, data addresses in fact have no relationship with the disk addresses on x, y, and z.

In aspects, the consumer devices are configured to encode the information relating to the data, and then generate a data address containing such encoded information, according to a convention. Consumer devices may have loaded thereon (or in accessible memory) software that provides the necessary instructions to obtain an object ID from the name service (if no object ID exists), to generate a data address and then encode the information in the data address and, if applicable, in the header of a packet payload. In some aspects, instructions and logic relating to the use of prefixes in data packets can be implemented by software that is loaded on the consumer device. In such a way, generation of data addresses and the use of prefixes in data addresses at the consumer device can be implemented to give the local consumer device some control over where the data is stored, or on what type or group of memory devices. In some cases, specific ranges of data addresses may be associated with particular memory resources (or a group or class of memory resources) and in such cases it is possible for the consumer device to be aware of these associations and generate data addresses within selected ranges to implement storage for data from some data objects in specific memory resources (e.g. the consumer device may be given a requirement to store some information locally, or to store frequently accessed information in low-latency storage, or to store particularly sensitive data on memory resources with high security and low failure rates, or any other such requirement or operational objective). In other cases, the consumer device may have not have access to this information and thus control over the designation of memory resources may entirely be handled at the network component by, for example, the network component assigning to the network component specific data address ranges that the network component has associated with certain memory resources. In other words, the network component is "ignorant" to this requirement. In some aspects, partial control may be given to the consumer device and partial control maintained at the network component through designation of address ranges. In some aspects, no software instructions on the consumer device is required and the encoding and embedding of information that identifies the data in the data address will occur in accordance with an existing network protocol, a specifically designed network protocol, or an interface may intercept and amend the data addresses to encode and embed the data identifying information.

Any conventions for identifying the data may be implemented. An example, included herein to provide an illustration of possible conventions, may include the following: the top digit of the data address corresponds to a specific memory server, and the remaining three digits to name a location on that server's disk. This would specifically be for a direct mapping to local disk addresses on consumer devices, as follows:

Data addresses 0**** map to Disc X
Data addresses 1**** map to Disc Y
Data addresses 2**** map to Z In the above example, data address 0000 would go to x, and x could know to map it to its disk at 000. 1000 could go to 000 on y. The consumer device knows nothing about the disks that are being used to build the system, it just knows that it can use addresses from 0000 to 2999.

As a completely different exemplary convention, consumer devices could agree to use the first two digits to identify an object (e.g. object ID) from which the data associated with a request originates, and the second to identify a location in that object (e.g. offset) where that data is found in the data object. In this convention, objects can be a maximum of 100 bytes (00 to 99). When a new object is created, the system would choose a server to host data from that object (or in some cases, the object); in other words, the mapping resource maps the data according to criteria relating to the data address. So for data objects 00, 10, and 25, the mapping resource may wish to map the objects to the memory devices in accordance with the following policy (or indeed specific mappings):

00** maps to Host x
10** maps to Host y
25** maps to Host z

A write to byte 10 in object zero would be addressed to 0010, and sent by the network component to x. x would then be responsible for understanding where 0010 is stored on its disk. The consumer device, in this example, can send network instructions as if it was directly to the data.

In some aspects, the system is configured to provide direct mappings for specific pieces of data by associating data addresses for constituent portions of data objects that are comprised of such specific pieces of data, and then by taking advantage of the ability to store information that identifies that constituent portion within corresponding data address, the network infrastructure can handle traffic specifically for granular pieces of data. The network infrastructure can direct memory requests directly to the specific storage location for highly specific and granular portions of data.

In one aspect, the creation of data addresses that can be used as the higher level data addresses that include information identifying the data, can occur in the following two stage process:

Stage 1: Address Encoding

A consumer device requires a read of byte 1024 of a file named "a.txt". The file system (or in some cases, the name service) maintains information that allows the consumer device to determine that "a.txt" has object ID "34". The network protocol used in an aspect of this patent ENCODES this file name and offset as address 00341024. In other words, it concatenates the two values, using the first four digits to store the object number, and the second four digits to store the offset within that offset. This encoded address is used as the destination address in a packet that is sent to the network. Whereas, IP and other standard network protocols normally use the address of a computer as a destination address, aspects of the instantly disclosed system uses that address field, which is read by the network component, to instead hold the address of a piece of data, irrespective of where it actually resides.

This encoding stage is a convention than a mechanism. Applications of this protocol or methodology will need to decide on an encoding that suits the needs of the consumer device or the network protocol. In some aspects, the convention may be determined by an administrator and coded into the system. Concatenation of object and offset is one possibility. Flat offset into a large byte-addressable address space is another.

Stage 2: Address Mapping

Mapping is the process by which the network transparently resolves the data address that is stored in the destination field of the packet described above, to a storage location where that data currently resides. Even for relatively static mappings, aspects can take advantage of the hardware of the network component to forward data to a changing set of physical hosts. The broader insight is that all sorts of dynamism may applied to this mapping, to do things like load balancing, fencing of hosts, failure recovery, achievement of operational objectives (e.g. high speed, high safety, low-latency, etc.).

In some aspects, a centralized nature of the network component facilitates the use of the network to achieve updates to mappings across an entire set of distributed memory systems, irrespective of agreement among individual memory resources or storage locations therein. This means that the network, as a set of one or more central devices, can be used to enforce that a change to mappings happens either all at once for memory resource in the system, or not at all. This is important because it is used to ensure consistency: the idea that all clients in the system always share the same view of the data being stored without requiring that memory resources communicate with one another.

In some aspects, the memory resources may comprise of storage distributed across end hosts, conventional storage targets, and possibly on-switch flash (this can be used to buffer replicated writes under bursty load). The network switch of the network component distributes requests to the hosts that hold the data by treating the request as an IPv6 address (i.e. data address) and forwarding it according to routing tables (in this aspect, the mapping resource of the network component), which are constructed by a control plane in the network component. Aspects of this architecture allow any memory resource to write at the aggregate maximum write bandwidth, and to allow the cluster to saturate on writes while preserving consistency and redundancy.

Consumer device memory instructions may be handled at one of several locations: either as a library linked in to a client application, as a kernel extension, or when the client is virtualized, as either a virtual machine appliance or a hypervisor driver. The lowest latency configuration is one that removes as many data copies or other request processing delays as possible. For example storage (flash cards) and NIC ports connected to the network component are directly mapped into the front end (e.g. through VMware DirectIO), and the front end is mapped into the consumer device application as a shared library.

The front end is responsible for translating the requests from the form used by the consumer device (e.g., path name and offset) into the network address form used by the forwarding layer. Note that the traditional file system interface (path names, POSIX-like file operations) is only one of several possible interfaces. For example, the store could also present itself as a key-value store in the client library, with a more direct and thus more efficient translation into the native format of the storage system.

In one aspects, information that identifies data is may be directly transcribed onto existing network protocol address spaces, such as the IPv6 and Ethernet protocols, although any protocol network address spaces may be used. Hardware implementation of known switching hardware can quickly forward these messages in the network. The network switch's position as an intermediary between a large number of memory resources is leveraged to achieve consistent changes related to addressing within the cluster of memory resources.

In one aspect, a two-layered model is utilized that overlaps IPv6 and Ethernet. The IPv6 address space is used to represent a data address for a data object as follows: a 128-bit IPv6 address is split into a concatenated (object id, byte address) pair. In this aspect, there is an even 64-bit/64-bit split (with a small amount of loss at the top of the object ID that arises from IPv6 address assignment conventions). This split is somewhat arbitrary and could be adjusted to allow other data representations, such as a simple tree hierarchy, or an absolute index into a sparse address space as is used (albeit above the host level) by KV stores such as chord. As such, this aspect does not rely on end hosts (i.e. memory resources) in the system each maintaining a (possibly inconsistent) mapping of all data addresses to all end hosts (and also each network switch maintaining a lookup table, which may also be, or become inconsistent), but rather encodes a the IPv6 destination with data identifying information to form a data address, and permits consumer devices to send network messages directly to data. When such prior memory resources maintain mappings to their own data (and in some distributed memory systems, mappings to data on other memory resources), changes to or movement of data becomes redundant or renders data unavailable on one or some memory resources in the distributed memory system; further, related data (e.g. backup copies, or live portions of data objects stored across multiple memory resources) must be maintained appropriately. This means that highly complex logic and safeguards must be in place, or the data becomes inconsistent or unstable—and in many cases both. Since aspects of the instant disclosure do not require that memory resources maintain mappings to their own data, and this mapping is handled by a central network component, significant complexity at the memory resource (as well as conventional network switches in the associated network infrastructure that must maintain lookup tables specific to these mappings) is made redundant. Moreover, the consumer devices in aspects of the instant disclosure may send network requests specifically to highly granular portions of data (e.g. a specific byte in data objects like files).

Upon a consumer device of the instant disclosure sending a memory request (i.e. read/write/update), it becomes the responsibility of the network to ensure that that request reaches the data, wherever it may currently reside. In some aspects, Ethernet-level addressing is used at this stage and uses IPv6 over Ethernet. The network components in this aspect map, in the mapping resource, IPv6 addresses to the Ethernet-level MAC addresses, which are resolvable to individual memory resources. Network components maintain a mapping resource (which may be analogous to forwarding or lookup tables in standard network switches). The mapping resources permit network components to use network switches that are use very low-latency memory and thus can implement routing in a very fast and simple manner. The memory resource can identify the data associated with the memory request according to the data address and subsequently act accordingly (including by storing or updating data and providing acknowledgement, or by reading and providing the requested data).

In aspects, the consumer devices are configured to generate data addresses at the IPv6 layer which remain global and constant, and uses the network component switch's mapping in the mapping resource of IPv6 addresses to Ethernet addresses in order to reflect the current location of a piece of data. Ethernet addresses as ephemeral, session-oriented mappings of where a given piece of data is right now. Network attached disks (the storage nodes on which the data actually resides) assign virtual MAC addresses that reflect active data. In this manner, a message to an IPv6 data address on the network component is resolved to an Ethernet address instance that is given to the memory resource that currently houses that piece of data. The Ethernet address space, then, is allocated in a rolling manner, as data access is required.

Note that IPv6 address prefixing and wildcarding allows a range of data to be assigned to a specific MAC address instance, or range of MAC addresses. This is done by sending an advertisement indicating that all IP addresses in a contiguous range of IPs reside at a specific MAC address.

While the above aspect describes an instantiation using IPv6 data address and Ethernet addresses, but other aspects may not be tied specifically to those protocols. In the above aspect aspects of these protocols are leveraged to carry information within in an IPv6 protocol, but other aspects may use other network protocols known in the art. IPv6 utilizes fast implementations on modern switches, such as the one described in the aspect above, which permits high speed performance while having a useful interface to help enforce consistency of mappings. However, other network switches and protocols, including but not limited to SDN-type switches, as would be known in to persons skilled in the art, may also permit alternative switch hardware to efficiently forward new protocols at the L2 and L3 layers.

Although the above aspect utilizes mappings on commodity switches with IPv6 and Ethernet protocols, other aspects may utilize other switching and network technology and use other types of network-based addressing to route requests for stored data. Many other forms of switching and network technology and/or network-based addressing protocols or methodology, including those which may not be developed yet, may be used without departing from the improvements relating to the use of the generation of data addresses comprising information relating to the data, which can then be mapped to storage locations within memory resources described herein.

The mapping resources in some aspects operate like forwarding tables in known network switches. In some aspects, the mapping resource operates as a cache in the network component in the same manner that a TLB (Table Lookaside Buffer) is used to speed up virtual memory accesses in a computer's MMU. Instant aspects of the system maintain, outside the network switch of the network component, a set of mappings in the mapping resource linking the data address generated at the consumer device (which in some aspects may be represented as 128-bit IPv6 addresses) to the locations where that data resides. The network switch of the network component is then used to enable fast forwarding of the memory requests. In cases where the network switch does not currently have a mapping for a given address, it will generate a request for a resolution (for instance, using the IPv6 Neighbor Discovery Protocol), at which point the mapping may be looked up from an in-memory or on-disk data structure, and returned to the switch. An important benefit to this approach is that the job of resolution may still be pushed entirely to the requesting host, as in the hash mapping used by Chord. However, in that case, the hash function would map a data address to one of n Ethernet addresses, each representing a memory resource but if the system decided to move a subset of data from an active memory resource, or if the memory resource failed and corrective action needed to be taken, the mappings in the mapping resource can be invalidated (by indicating that the associated Ethernet address is no longer reachable) and the originating memory resource can handle the exception by coordinating to resolve a new address. This approach avoids the inconsistency problems that often arise in distributed storage systems.

Information relating to a storage location, which may be contained within a mapping resource, may refer to any information relating to the storage location where data may be stored. In certain instances, this may be a MAC address or an IP address of a memory resource. Addressing methodologies of other communication protocols, which may or may not be developed, may be used without departing from the principles identified herein to map data addresses with storage locations. In other instances, the information may be information pertaining to a port, for example in a network component, which is responsible for or linked to a certain range of memory resource addresses. In certain instances, this may be information pertaining to the actual physical memory address on a hard disk or SSD within a memory resource where data may be stored. In certain instances, this may also be information pertaining to memory address, in a virtual environment, where data may be stored. The information relating to a storage location may also refer to an association for a range or class of data addresses, as identified according to predetermined portions of the data address, to a particular scheme for associating specific data addresses that fall within such range or class with memory resources. In other words, instead of associating each data address with a static piece of information relating specifically to a particular memory resource (e.g. MAC address), it may associate the range or class of data addresses to a scheme for distributing the memory requests associated with the data addresses in a manner that meets some operational objective (i.e. replication for preventing loss of data, low-latency, safe storage, etc.). Where the memory request is sent as a result of this scheme may be stored in the mapping resource, or the mapping resource may utilize address resolution protocols to determine where the data actually resides.

In some aspects, the network switch of the network component provides a central point of control and actuation for data storage locations that is not present in traditional completely end-host-addressing-based distributed storage. Rather, managing forwarding on the network switch at the network component (in conjunction with the mapping resource), by mapping the data addresses (that contain data-identifying information according to a convention) to information that relates to the storage location of the data in a memory resource (e.g. a MAC address) the following functionalities are achieved:

The network component can be used to invalidate object mappings authoritatively with no complex logic or inter-memory resource communication to ensure consistent and up-to-date versions of data in storage;

Forwarding on the network switch can be used to dynamically redirect requests in a live system; and Control over forwarding can also be used to "fence" or isolate memory resources that are in unresponsive, unknown, or otherwise inconsistent states;

The mapping resource, which may in some aspects be a switch-based forwarding table, represents a caching resource, similar to a TLB on modern computers' MMUs, which can be managed for performance in the software components of some aspects. In aspects, request-originating memory resources may resolve mappings for memory requests, but the instantly disclosed subject matter allows a useful mechanism for safe and high-performance interception of those requests that will not render data residing on the other memory resources inconsistent since the mapping resource can identify and monitor the requests and update (or even subsequently change) the mappings to maintain consistency.

In some aspects the network switch of the network component is able to dynamically take action on in-flight requests based on operational characteristics of the memory resources, the consumer devices, the network and network resources, the data itself, and even the end user. In some aspects, this permits at least the following functionalities:

Load-aware write targeting: The network component can direct write requests to the NAD or other memory resource that is currently serving the fewest active requests and update mapping appropriately. This results in a balancing of load in the system and a reduction in write request latency.

Multicast fan-out for replication: In common operation, writes must be written to more than one NAD in order to survive failures. The network component can perform such fan-out of requests, permitting consumer devices to need to only send one request to the network, and the network component will duplicate the request as may be necessary to the two or more replica memory resources. Note that in conjunction with the load-aware write targeting, described above, the memory resources storing the duplicate versions of the data could be the two least loaded hosts.

Load aware read "anycasting": In respect of a memory request for a read, where the data is replicated on multiple hosts, the network component provides for directing read requests to the least loaded memory resource rather than the memory resource that is using the "active" (i.e. non-back-up copy). The network component is aware of all replicas for a given piece of data, and thus it remains free to forward read requests to the least loaded memory resource. In such cases, there may be no "back-up" copy but rather any of the copies may be used depending on operational characteristics of the system.

The memory request decision process, made on the network component, as to where a given packet or request should be forwarded, may be based on the current "load" as indicated by outstanding requests (or queue depth) on each of the memory resources. Other operational characteristics of the memory resources could also be considered, including but not limited to the available space on the target devices, their performance relative to other devices, security or failure rating, or other characteristics that would impact performance of the memory resources or requirements associated with a memory request or instruction. A combination of operational characteristics of other aspects of the system, such as the nature of the data, the consumer device, the end-user, and/or the network. As an illustrative example, data for which the network component is aware is subject to frequent read requests by multiple users may be mapped by the network component to multiple memory resources, each of which are particularly suited to responding to read requests quickly or with low-latency. In another example, the end-user may require significant levels of reliability and would be willing to sacrifice speed therefor, in which case the network component, once it becomes aware of such operation characteristics, can map data address associated with data from these end-users (or their consumer devices) to memory resources having high reliability characteristics.

In some aspects, allocations can be made according to the mappings determined at the network component (in the mapping resource) once the network component is aware (i.e. provided with the necessary operational characteristics and/or operational objectives) that a memory resource is more capable of meeting a particular requirement than other memory resources, that a particular memory resource is to be dedicated for a particular use, that a particular memory resource is to be prioritized for a particular use over other memory resources, or that a particular memory resource is available for a particular use. In exemplary aspects, some types of memory storage may provide varying levels of different operational characteristics that would be better suited for (a) certain types of data having certain types of data type characteristics; or (b) achieving a pre-determined operational objective as requested by, for example, the user or system administrator. These operational characteristics and operational objectives may include, but are not limited to, characteristics relating to speed, integrity, redundancy, persistence, security, methodology of implementing memory instructions (e.g. log-based methods and conventional block-based non-journaling data storage schemes or other methodologies known in the art), association with a file system (i.e. whether or not use of a particular file system will tend to increase or decrease achievement of a particular operational objective or policy on a particular type of physical memory resource). Other characteristics of memory resources known to persons skilled in the art can be considered a pre-determined memory characteristic, whether or not disclosed herein or even known at the time of filing, without departing from the spirit or scope of the disclosed subject matter. The data type characteristics may apply to data types that, for example, are likely to be read, written or updated more or less frequently, are more sensitive to corruption or threat of being subjected to unauthorized access or amendment, have a requirement to be read, written and/or updated in a high-speed manner or need only be read, written and/or updated in a low-speed and/or infrequent manner, need to be accessed by many users; or need to be accessed by a narrow class of users. Other data characteristic known to persons skilled in the art can be considered to be an applicable pre-determined data type characteristic, whether or not disclosed herein or even known at the time of filing, without departing from the spirit or scope of the disclosed subject matter.

In some aspects, memory resources having one or more shared pre-determined memory characteristics may be dedicated and/or prioritized by the network component for use by data types having one or more shared pre-determined data types characteristics. To the extent that the memory resources are not available or for which another use is more highly prioritized, other physical memory resources may be used that may provide a reduced ability to achieve an operational objective or policy, but nevertheless higher than other available memory resources. The level of prioritization, or acceptable reduction in ability to meet such operational objective or policy, may be pre-determined by a user or administrator. In some aspects, physical memory resources can be dedicated or prioritized according to a policy or policies that best leverage relationships between operational characteristics between end-users, consumer devices, the network and network components, and the memory resources in order to best achieve said policy or policies. In some aspects, policies or operational objectives can be applied across organizations (i.e. cross-application, cross-host, cross-user, etc.). In some aspects, policy can be applied across "semantic" layers, allowing finer grained treatment of stored memory than has traditionally been possible. For instance, in a storage system that traditionally manages highly distributed memory resources, one exemplary policy would allow for the treatment of specific files, file types, or records within files in a different manner than the rest of the virtual memory component. Memory characteristic may include, but are not limited to: high-performance storage capability, durable storage capability, storage configured for encrypted data, configured for replication, configured for synchronization, configured for audit requirements, configured for ease of deletion, configured for multi-client access or use, configured for rapid access/read/write, etc., or a combination thereof. Data type characteristics may include, but are limited to: frequency of access, high or low sensitivity, security requirements, accessible by multiple users for concurrent use, configuration type files, etc., or a combination thereof.

In some aspects, other protocols for data-addressed network forwarding, including existing or specifically-designed protocols, may be used, other than, for example IPv4, IPv6 and Ethernet. For example, since IPv6 has a 128-bit target address, but certain ranges within this address space have specific meaning and are treated differently by switching hardware which therefore limits certain regions of the address space, different protocols, including those specifically designed for the instant system will benefit from a dynamically-sized address field, possibly also not requiring an entire 128-bit source address, given that request sources are in fact memory resources or consumer devices, rather than pieces of data. In some aspects, protocols supported by SDN-based switches are utilized for data addresses and/or the information relating to the storage locations.

In an exemplary aspect, approaches described herein would unify addressing of data in a collection of networked computers, including memory on the consumer device (RAM), local disks and flash devices, RAM and disks on remote memory resources, including enterprise storage targets, and even remote, cloud-based storage through services such as Amazon's S3. This allows a centralized configuration to indicate how data should be mapped to ranges of the global address space, and the MMU on a given host, would simply translate requests that could not be satisfied from its own memory into data-based network addressed. These requests would then be forwarded to the appropriate destination and returned from there.

In aspects, Ethernet and IPv6 protocols are used to map data addresses and storage locations across the distributed memory resources. Other aspects support implementations using protocols that can be used on systems utilizing SDN interfaces such as OpenStack, Arista Networks' EOS APIs, and Intel's new Fulcrum-based 10 Gb switch reference architecture.

In some aspects, the sufficient systems level support are deployed to the network component, the consumer devices and the memory resources, including applications, libraries, operating systems, host computing platforms, and/or network switching hardware/software, such that requests to access memory can be encoded in a network-relevant representation (i.e. the consumer device can generate a data address in accordance with the conventions disclosed herein to carry the data-identifying information) and that the network switching and endpoint network stacks be able to handle these requests appropriately. The deployment may in some aspects be similar to RAID methodologies in that RAID supports a set of codings and related mechanisms for spreading data over a collection of disks, while the instantly disclosed aspects support the addressing of data and address/placement management techniques that allows the network to appropriately support high performance distributed memory implementations. In most aspects, an end user of the instantly disclosed system will have no specific awareness of the underlying mechanism.

While some aspects focus on datacenter networks, where there is a great deal of desire to realize high-performance, scale-out memory/storage implementations, other aspects may be utilized in any situation where distributed memory resources are addressed over a shared network or bus, and where the common approach in that network's implementation is to map data addresses associated with specific pieces of data to memory resources. Aspects are applicable to any such system as the methodology can be either reused with little or no modification, or modified in order to allow the direct addressing of specific data resources that reside on those end components. Directly addressing data facilitates the addition or removal of components, the migration/mobility of data, replication, load-balanced placement, and other benefits. Aspects of the disclosed subject matter may also be applied to hardware components (such as SATA or SCSI discs) on a host device bus (SATA/SCSI/PCI). Alternatively, it could be applied in the wide area internet, for instance to allow data movement across physical sites over time, or efficient wide area replication. In other aspects, data may be stored at storage locations that are not actual disks or other physical memory resources. Any memory resources are sufficient, and the approach is potentially very useful in building large-scale, high-performance, replicated shared memory systems, within the RAM memories of many computers in a cluster that may be combined into a large addressable memory. Virtual memory resources may be utilized in connection with the disclosed subject matter as the memory resources.

The following functionalities and/or operational objectives are enabled in aspects of systems, devices and methods described herein:

Memory/storage access requests can be implemented in an address format (i.e. data addresses) that is directly interpreted and used to make forwarding decisions by switching elements (the network switch of the network component) on a computer network;

Two-level addressing schemes described herein facilitate "global" or long-lived data addresses are encoded in the higher-layer protocol, and mapped dynamically to addresses in the lower-layer protocol that reflect the current location or desired treatment of that data in the network;

The use of address resolution protocols (such as ARP in IPv4, or NDP in IPv6) or similar mechanisms to populate forwarding tables on switching elements, including the network switch of the network component, with the appropriate lower-level address when a new high-level address;

The use of virtual memory or MMU implementation techniques in the mapping resource of the network component, such as page tables, or mapping trees, to provide a current, canonical set of all address mappings between the two layers, and the use of this global view of all mappings to respond to address resolution requests, including those described above;

The use of the address resolution protocol or other interactions with the switching elements of the network to dynamically update the location of specific pieces of data within the mapping resource, including, as an illustrative example, in an IPv4 network is the transmission of an unsolicited ARP response to force a remapping of an IP address from one physical location to another;

The use of that same remapping approach to invalidate an active mapping, in order to force future accesses to that mapping to trigger a fault, and in some aspects, a new address resolution request, which can be used to force the mapping resource in the network component to remove mappings to stale data, even in the event that the memory resource responsible for that stale data has become unresponsive;

The use of that same remapping approach to redirect requests to an intermediate element, on which they may be buffered, which among other benefits allows in-flight accesses to data to be paused so that changes to the underlying placement or content of that data may be made at the mapping resource level to maintain consistent and safe access to that data which can be moved to (or updated on or associated with a back-up copy on) another memory resource;

Address management techniques to provide a central view of the entire data address space, describing all data and its mappings of associated data addresses onto specific physical locations, and the development of mechanisms associated with that global view to dynamically change the placement or encoding of data based on operational characteristics or objectives of the system;

Remapping of data addresses and storage locations for transferring infrequently accessed data to slower, less expensive forms of storage and promoting frequently accessed data to faster forms of storage;

Remapping of data addresses and storage location to manage the degree of replication, including, for example, techniques in which a single high-level address maps to multiple low-level addresses;

Mapping schemes (or routing methodologies) to achieve de-duplication, or the remapping of multiple data addresses that point to multiple "copies" of identical data such that they point to a smaller number of shared copies of that data, in order to save space and improve efficiencies of memory requests or instructions (e.g. reads, writes and updates) to same or similar data;

Mapping schemes (or routing methodologies) to migrate data to tolerate failures, or to balance load in terms of data access;

The use of generalized address representations in network forwarding, such as prefix-based forwarding rules, to allow the assignment of ranges of data addresses (e.g. all data addresses within a particular range, which may be supplied to the consumer devices to generate data addresses for specific pieces of data according to a convention) to a single specific lower-level address may point to a specific memory resource or class of resources to implement a designation of particular memory resources for particular consumer devices (or a class of consumer devices) or particular data;

The use of specificity in generalized address approaches, such as longest prefix matching, to allow subsets of a large mapped range of data addresses to be remapped, for reasons including but not limited to load balancing, to move a "hot" piece of data onto a less contended destination, or other operational objectives;

The use of this high-level data address representation, and mapping thereof to lower-level addresses relating to storage locations, to allow consumer devices to effectively balance the placement of data across multiple endpoints, without requiring a large number of forwarding table rules; for example, prefix matching may be used to divide a data object associated with a number of data addresses into four equal groups of data addresses, wherein a portion of each such address contains the data object's id code and a data offset id code, followed by the remainder of the data address and the remaining portion of the data addresses, which are not used to identify the data from the data object, determine which of the four groups of data addresses that such data address will belong. Aspects of the instantly disclosed subject matter can support memory requests from consumer devices in which such requests are made with a prefix that includes the object id and offset id, but not the remaining address, resulting in the data within the object being divided across mappings associated with the four groups of data addresses, each group of which can each be associated with a specific memory resource or class of memory resources in order to achieve a particular operational objective associated with that data object;

The prefix mapping scheme approach described above can also be used to divide data from a data object into storage locations across the distributed memory resources associated by the network component (as set by an administrator or in accordance with an operational objective) for particular ranges of data addresses having the same prefixes. For example, in some aspects the use of data address hashing by the requesting consumer device to encode a hash of the data address that will uniformly distribute requests relating to data from the same data object into the associated groups of data addresses that share the same prefix. Rotational shift of data addresses such that the lower-order bits in a data address are rotated to the high order bits of the address. This rotation allows prefix matching to describe an arbitrary-grained "striping" of the data of the data object across the groups of data addresses. In some aspects, the expansion or contraction of prefix sizes is possible to redistribute or rebalance the placement of a data from a data object, or range of data addresses that can utilize the same or similar address space for the prefixes, across multiple hosts in a dynamic manner. The terms mapping schemes, routing methodologies or forwarding rules may be used interchangeably herein.

Referring to FIG. 1, there is shown an exemplary aspect of a system of distributed memory resources managed over a network 100. There are shown a plurality of consumer devices 110, which may be referred to herein or by persons skilled in the art, as end-user devices or clients. The plurality of consumer devices 110 comprises of n consumer devices, shown as 111 to 114. The consumer devices 111 to 114 are communicatively coupled to the network component 120 and are configured to send memory requests (i.e. requests to read, write or update data in memory), each of which are associated with data address that is capable of having contained therein encoded information that identifies the data in respect of which the memory request will apply. The encoding, and how the encoded information is contained in the data address, may be implemented in accordance with a convention. The network component 120 comprises of a network device 122, which is in some aspects a high-speed network switch requiring little or no complex logic, and a mapping resource 121, which contains in a lookup table associations between the data addresses and information relating to storage locations. The information relating to the storage location may be any of a number of different granularities. The network component, via external communication ports (not shown) is communicatively coupled to a plurality of memory resources 130. In the example shown, each memory resource 131, 132 are coupled to their own unique communication ports on the network component 120. It should be noted that in some aspects, multiple memory resources may be connected to a single port, or a single memory resource may be connected to multiple ports. The memory resource is configured to identify the data to which the memory request pertains by decoding the data identifying information contained in the data address, and then either locating the data (in the case of a read) or the appropriate location therefor (in case of a write or update). A response in the form of the data that was read, or an acknowledgement of the write, is returned to the source of the memory request (i.e. the requesting consumer device). Memory resources 131, 132 may have a mechanism for recognizing the convention and then decoding the data identifying information and subsequently using such data to manage its internal file system. This mechanism may include software, a specified protocol, or an operating system.

Figure 2:
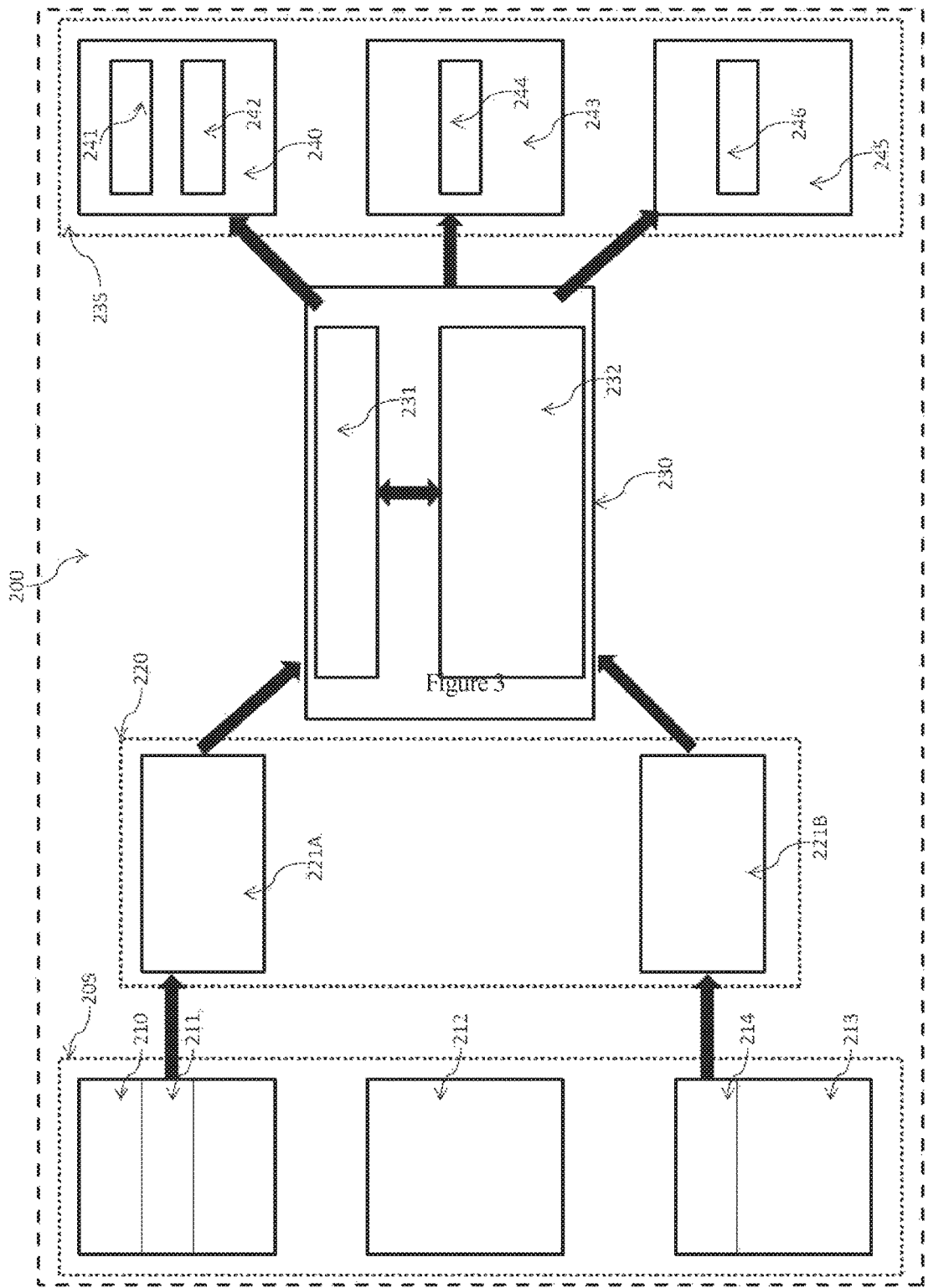
FIG. 2 depicts an exemplary instantiation of an aspect of the subject matter described herein showing a relationship between data objects and portions of constituent data, a network component, and distributed memory resources.

In one exemplary aspect, as shown in FIG. 2, there is shown a system for integrating distributed memory resources 200. In the aspect shown, there is a group of data objects 205 that may reside on one or more consumer devices. Individually, these data objects 210, 212 and 213 represent files in use by the consumer devices (although any other data object may be used without departing from the approaches described in this disclosure). The first data object 210 is a file entitled "a.vmdk" and which has an object ID of "0". This data object 210 comprises a set of data, a portion of which is the data at offset 4096 bytes 211. This portion or region of data 211 is associated with a memory request sent by a consumer device (not shown). The memory request may be a read request from the distributed memory storage; alternatively, it may be a write or update request that would include information to be written at the appropriate storage location. At an interface 220, a data address to be used in the destination field of a data packet associated with the data 211 is generated wherein the data address is encoded according to a convention. The data address is generated at an interface 220 between the consumer device (not shown) and the network component 230, such interface may exist at the consumer device or at an intermediary device. The data address would be encoded with an object ID that relates to the file "a.vdmk" 210, in this case 0, as well as information relating to the offset of the specific region of data 211 from the data object 210. As such, the data address corresponding to this region of data 211 will be encoded with this information. In an exemplary aspect, in accordance with one convention, the data address for the specific data 211 is encoded as, or as containing, a 4-byte data object address and a 4 byte data address, resulting in a data address comprising of 0x0000 (0 in hexadecimal format) and 0x1000 (4096 in hexadecimal format). The resulting data address would be 0x00001000, which is generated with the encoded data-identifying information embedded therein at an interface 221A. The interface 221 may reside on the consumer devices themselves, and be implemented in accordance with software on an application layer, or a protocol on a higher layer, or it may reside on a network device that is communicatively connected (not shown). To access the region of data 211 in the first object 210, a consumer device that is using that data (not shown) encodes or causes to be encoded the object and data ID in a data address and sends a request to the network addressed to that address, instead of to a specific network device address. With respect to the data object having the file name "c.vmdk" 214, that has an object ID of "2" a region of data from offset 0 would be encoded at interface 221B and used to generate a data address of 0x00020000 (i.e. a concatenation of 2 in hexadecimal format and 0 in hexadecimal format). No memory requests are being generated in FIG. 2 for the data object with filename "b.cmdk" and object ID of "1" 212. The network component 230 resides on a network (not shown) that is communicatively linked to both the consumer devices (not shown) and the distributed memory resources 235, and comprises a network switch 231 and a mapping resource 232. It should also be noted that the consumer device may be one of (or may comprise of) the memory resources. The network switch 231 is, in this aspect, a low-latency switch and requires very little complex logic to direct memory requests and responses, but rather receives information from the mapping resource 232 for directing or routing such requests and/or responses. The mapping resource 232 maintains, in most aspects, the logic necessary to implement routing decisions in its mapping tables, as well as the logic for creating such associations. The network component 230 maintains mappings between data addresses and information relating to storage locations (e.g. a network address of the memory resource, an address that points directly to a storage location on the device of the appropriate memory resource, or the port on the network switch which connects to the memory resource or network segment upon which the memory device resides). The network switch 231 consults the mappings in the mapping resource 232 and in cases where there is no mapping for that data address, the network switch 231 or the mapping resource 232 may perform lookups to an external lookup table (not shown) through an address resolution protocol, or it may route the memory request according to a mapping scheme or routing methodology. Data addresses may be resolved to forwarding operations that should be applied to the request (e.g. striping across ranges of data addresses to send to memory resources in a distributed fashion). The set of distributed memory resources 235 comprises in this case of memory resources 240, 243, 245. In the exemplary process flow shown, the mapping resource 232 has, based on operational characteristics of the data and memory resources involved, as well as its own workload, assigned all data addresses with the data address prefix of "0000" to memory resource 240 and all data addresses with the prefix of "0002" to be striped at 64 KB chunks between memory resources 240, 243 and 245. As such, all the data associated with data address 0x00001000 is stored on memory resource 240 at a storage location 241 thereon, and respective 64 KB chunks resolved in round-robin manner and recorded at the mapping resource are stored in respective storage locations 242a, 242b and 242c, respectively. Data can be stored on memory resources according to specified static mappings in the mapping resource 232, or in accordance with mapping schemes (e.g. the striping or hash functions) as specified at the mapping resource 232. Memory resources 235 may store, what is from the perspective of the memory resource or the consumer device, arbitrary portions of data, including subsets of a complete object that can be spread across multiple memory resources or replicated across multiple memory resources or any combination thereof.

The memory resources, in some aspects, are configured to receive the data address and decoding the information identifying the data of the data object. Upon receipt of a memory instruction relating to data of a data object, the memory resource is able to identify the data in respect of which the memory request relates by interpreting the decoded identifying information contained within the data address. In the case of a read request, the information identifying the data permits the memory resource to efficiently determine where the information is stored and return the necessary information that is responsive to the read request. In respect of a write request, the data address is associated with the data to be written.

In some aspects of the instantly disclosed subject matter, there are provided uses of the systems, methods, and devices disclosed herein to provide centralized memory resource administration to providers and consumers of memory storage systems. In some aspects, aspects of the instantly disclosed subject matter include uses of the systems, methods, and devices disclosed herein to provide and/or manage distributed memory resources wherein users of the system are charged on a per use basis (including, for example, the number of memory requests or the amount of storage used) and/or further the basis of various usage factors, including but not limited to a user's level of usage, the number and type of distributed memory resources that are used, and the number of network segments served by the network component. In other aspects, there are provided uses of the disclosed systems, methods and devices, to provide enterprise storage that can provide and/or manage virtual memory components, optionally in accordance with one or more pre-determined policies, for any network of communicatively coupled physical computing devices, wherein at least one of which comprises physical memory resources. In some aspects, the disclosed uses and methods may include incurring charges upon utilization of the disclosed systems, methods, and devices, including, for example, incurring charges upon the communication of memory instructions, upon usage of memory resources on a fee per unit of memory basis and/or unit of time basis, upon use or installation of network components on a per installed basis (or alternatively as a license for the use of a set number of memory resources), or on a license fee basis.

Examples

In one exemplary aspect, the network component is implemented at a Control Plane within a standard network switch. The control plane manages mappings from data objects to volumes on end-host (i.e. memory resources). Mappings are pushed onto the forwarding tables (i.e. mapping resource) of the network switch of the network component as IPv6 routes. Mappings for low-latency local resources only are pushed from the master down to local devices. One way to distribute routing is to use routing tables on the hosts as well, giving them a default route of the network switch but letting them have a subset of routes for their own data objects (thus allowing them to utilize local storage for their own data objects, or depending on whether operational objectives would be achieved in view of certain operational characteristics, using distributed memory via the network component). In another aspect, logic that determines the routing of data may be implemented in combination with or as an alternative to the control plan or local routing tables. The logic may be associated with the information that forms the data addresses by, for example, associating specific memory resources or operational objectives to data addresses having predetermined prefixes. For example, all data addresses beginning with, ending with, or comprising therein a particular range will be routed in a particular manner or to a particular memory resource or class or group of memory resources. Pushing default routing logic or tables onto local devices but letting them have a subset of routes for their own data objects may not always suffice when local traffic may also be better served remotely (e.g., if the local host is loaded and there is an unloaded remote host).

To create a data object, a consumer device provides a path name to the name service and is returned an object ID. The name service resides on the consumer device or in any location that is communicatively coupled to the consumer device, and is made available in some aspects by loading software with instructions for such a service. Along with the path name, the consumer device can supply a set of additional parameters, such as the replica set to which the data object should belong. If these parameters are not supplied, the name service will create a data object in a replica set it chooses based on global policy (e.g., the least full replica set of the minimum number of nodes where one node is the host that issued the request). Renaming a data object is done by a request through the name service, which simply updates its table from path to object ID. Deleting a data object is also done by requesting the name server to delete the given path. When data objects are created or deleted, the name server issues a request to the replica set that holds the object to either create or delete the object itself.

The control plane in the network component renders the data objects globally accessible. The volumes that host their data have IPv6 addresses, and the network component maintains the mapping from the data address, in which an object ID is encoded, to the volumes on which data of the associated data object resides as a set of IPv6 routes. Parts of data objects may be treated specially (e.g., hot ranges may be pushed to local flash on the client host) by generating routes at sub-object specificity by, for example, specifying on the logic routes with a prefix length greater than the length of the object ID.

The following routing for reads versus writes may be implemented in some aspects. "n-way" replication requires writes to be distributed to more than one location. Routes are not necessarily statically constructed to point to the locations where data may be found, but in some aspects may be constructed dynamically to optimize IO for the current workload. A service at the default route destination, i.e. the memory resource, can initiate or request the construction of new routing table entries at the mapping resource in the network component when there is requirement to service a request (since delivery to the default route indicates the absence of more specific routes) when, for example, the default route may be unavailable. Newly constructed routes can take into account, based on the operational characteristics, the current read/write loads on all of the volumes that can handle requests for the given data object range and create routes to the volumes that are expected to optimize current performance. Routes may also be constructed before the default route has initiated them. The default route simply ensures that all requests will be handled appropriately.

In some aspects, the network component may employ congestion monitoring methodologies. A process running on the network component watches the queue depth/latency statistics of the communication ports that are connected to the distributed memory resources and may take various actions when the queues become too deep or slow, such as invalidating forwarding table entries that point to congested ports (causing a route computation for a new routing to an alternate memory resource or set of memory resources attached a particular port) to be done the next time those addresses are received by the network switch of the network component, which will select the optimal route, and adding new routing table entries to optimize the paths between clients and volumes based on observed workload.

In some aspects, the network component may employ data migration methodologies. The congestion monitoring and routing table management services at the network component optimize I/O for the current workload and placement of data. Data can be moved or migrated from a memory resource (or class of memory resources), including at a granularity of sub-object (i.e. discrete portions of data for a data object) depending on the current workload. For instance, data of a data object that is being accessed frequently and that resides on a remote volume could be better served from a local volume, from both the point of view of the accessing client and the system as a whole. To this end, a service watches communication ports that are becoming over-utilized to see whether it would be beneficial to relocate some of the data residing on that port (e.g., if a request source has capacity and is responsible for a majority of the requests for a given object range), and triggers data migration if so. Data migration is performed by adjusting the replica set for the given object range to include the new memory resource, and synchronizing the new volume for the remapped data address ranges, and invalidating routes to cause the route management service at the network component to generate optimized routes that include the new volume.

In some aspects, the network component maintains as the mapping resource a database comprising information about the location of objects in the system, so that it can generate routes to the current versions of each data object range. Some states may be flushed if there is more data in the system than can fit in the memory available for the location database, or all of the state may be lost if the switch loses power. Therefore, the database must be recoverable from persistent data to recreate the information in the mapping resource. This, among other benefits, provides a source of back-up information and/or redundancy for the network component and/or the mapping resource. The contents of the mapping resource comprise a tree of net address (object ID+offset) ranges, where the leaves are the list of volumes holding current mappings. Data objects can be split among volumes at any granularity. Information in the mapping resource comprises various levels of data: data objects present in the system, how those objects are fragmented across volumes in the memory resources, and which volumes hold current data for which data objects, are a few examples. In some aspects, there is a global table of data objects that is always up-to-date in persistent storage: the name service creates the record of its existence including the replica set that holds it before returning the object ID to the caller, and likewise removes it before completing a deletion request. As creation and deletion are expected to be relatively infrequent compared to reads and writes, this is not expected to run into scalability problems or hurt overall performance.

The network component is configured to perform volume discovery upon addition of memory resources. ARP (Address Resolution Protocol) requests can discover live volumes: front ends should respond for any addresses (at any granularity) that exist on local volumes. A persistent database records all volumes added to the system.

Systems disclosed herein utilize ARP, and which is implemented in aspects of the instant system as follows. In general, a data packet contains, inter alia, a source IP address field, a source MAC address field, a destination IP address field and a destination MAC address field. When network computing devices are trying to communicate, a sending network computing device populates fields of a data packet and sends it over a network to the destination or receiving network computing device (i.e. memory resource). When the sending network computing device is not aware of the destination host's MAC address, this field may be populated as an all-zero MAC address and an ARP request is sent out. The network computing device that has the destination IP address associated with that data packet responds to the ARP request with its MAC address. If the data packet is received by intermediate network computing devices they will forward the request until the receiving network computing device receives the packet, or alternatively, an intermediate network computing device that is aware of the destination MAC address which will forward the data packet on to the receiving network computing device. The sending network computing device, or indeed the intermediate network computing devices, after receiving the destination host's MAC address, uses this MAC address in the destination MAC address field and sends the data packet over the network. Thus an ARP table may be populated. A populated ARP table may have mappings associating IP addresses (layer 3) to MAC addresses (layer 2). Similarly, any switch residing on the network may also have such an ARP table within. Further to the ARP table, a switch may also have a MAC table that associates MAC addresses to ports. When a switch receives a data packet with a destination MAC address, it uses the MAC table to learn which port it needs to forward the data packet to and directs the data packet to that port. If, in instances, where the switch doesn't have in its MAC table a MAC address to port association then it floods all the ports to which it is connected and when it receives a response from the appropriate computing device that is assigned that MAC address, it populates its MAC table so that the next time it sees the same MAC address, it would know which port to direct the packet. The population of the MAC table may happen as a by product of data packet communication during the population of the ARP table (i.e., the switch may learn of a MAC address to port association when an ARP request is in progress). As stated previously, in some aspects, the network component may utilize ARP requests to identify newly added or unknown memory resources; alternatively, in some aspects, a data address may be mapped to a port in the mapping resource that is coupled via one or more network segments to a plurality of memory resources and, accordingly, an ARP request, or similar, may be used by the network component to route a packet associated with a memory request (i.e. read, write or update) to the correct memory resource.

In aspects, some data addresses comprise of 128 bits and according to one convention can be encoded to consist of an object ID and data offset that uniquely identifies a datum across the repository. Reads may be satisfied locally if local latency is good, but may also be dispatched to the network component when the local resource is loaded. To avoid redundant reads and resulting capacity problems, the local device should avoid forwarding the memory request to the network component when it expects to be fastest, and the network component may also second-guess the device if it receives a request from a device for a local resource. To preserve the efficacy of the network component's network switch forwarding table (i.e. mapping table), which is used for maintaining low latency, the offset portion of the data address may be divided into chunks that are likely to be reused across a large number of requests, and include the actual offset and range as part of the request header in the payload. In other words, in some aspects, the data address can be used to encode Object ID, for which policies relating to data addresses can be implemented at the network component, and other information relating to the data of interest within the data object, can be mapped in the header in the payload. This header information can be used by either or both of the mapping resource to route data packets or by the memory resource to recognize the data and store it appropriately. In some cases, only the object ID portion will be used by the mapping resource to map the data address, as it can, for example, map all data addresses associated with a particular data object (i.e. all data having a similar prefix or other component of a data address) to a specific memory resource or class of memory resources (e.g. those with the lowest request queues). The chunk size of the offset portion of the data address could be dynamically tuned depending on operational characteristics of the observed workload, or configured for a given object/range according to a preconfigured policy. Write addresses may also be masked at finer granularity than read addresses, allowing for adjusting the competing concerns of load-balancing versus forwarding table hit rate differently for read/write workloads.

The following steps are carried out by the exemplary aspect described herein for a "read" memory request:
1. A client (i.e. consumer device) issues a read request comprising an Object ID, offset, and optionally length (if an Object ID does not exist, one is requested from the name service);
2. The read request is converted to a storage format: the Object ID is resolved to a data address from local cache that can be used as a network address; the data address may be masked for the mapping resource, and exact offset added as packet header rather than as part of the data address;
3. The read dispatched is locally if data is present locally and the volume queue depth/latency is below acceptable limits to meet operational objectives, otherwise, the request is forwarded to the network component;

4. If an entry in the mapping resource matches the data address of the request, the request is immediately forwarded according to associated lower level address (e.g. MAC address);
5. Otherwise, the destination is resolved according to an ARP request, or similar;
6. The recipient memory resource resolves the data for which the memory request relates based on the encoded information in the data address (and in some aspects, the header in the payload) and handles the request and returns the response to the source address.

In some situations it is more efficient to forward all requests to the network component, even those that are reflected back to the requesting host for processing. This can occur, for instance, in situations where network interrupts may be mapped directly to the software that is managing and handling requests, whereas on-host processor-to-processor communications require the involvement of an OS or VMM scheduler. In these situations, the shortcut path described in step 3 above is ignored.

The following steps are carried out by another exemplary aspect described herein for a "write" memory request, although in some aspects one or more memory resources may be the target depending on the replication policy that is implemented:
1. A client (i.e. consumer device) issues a read request comprising an Object ID, offset, and optionally length (if an Object ID does not exist, one is requested from the name service);
2. Writes are stored on disk in a with additional metadata including a logical sequence number so that the owner of the most recent object update can be determined by querying all holders of object data and choosing the one with the highest sequence number. This allows the system to survive crashes, while treating performance-critical cached metadata as soft state that doesn't need to be written to durable storage as aggressively as request data.
3. When a new route is generated, it is recorded in the mapping resource.

In some aspects, a path lookup for data from a data object can be implemented for memory requests (i.e. read, write or update). In such path lookups, a data address is resolved from or by a consumer device into an object ID in the repository by consulting a central namespace (or local) database. The request is forwarded once the consumer device receives, obtains or determines the object ID associated with the data object from which the data is part. On the basis of this object ID, the consumer device may, in some aspects, check for a local mapping. If the data object is present locally and the current request queue for the local storage is below a minimum threshold (wherein such threshold is set in accordance with one or more operational objectives), the request is queued locally. Otherwise, it is forwarded to the network component. The network component may forward the request to any memory resource that holds the object, including the originator of the request (i.e. the requesting consumer device). It chooses the target with smallest expected latency, based on request queue size.

In some cases, replication may be implemented. Data from data objects may be stored on multiple volumes, either as complete replicated copies or in a configurable kin error correction coding. These volumes may be represented on the mapping resource of the network component as multicast groups or as multiple routes for the same prefix in the mapping resource as, for example, IPv6 routing tables. In the latter case, the multiple routes for the same prefix are designated for all data addresses sharing the same prefix (because, for example, they refer to the same data object) which would result in data from that data object being distributed across all of the multiple routes either arbitrarily or according to a striping, hash or other data distribution scheme using the remainder of the data address (e.g. the offset portion of the data address).

In some cases, when the network component receives a read request, it will choose the least loaded or lowest latency subset of n memory resources (this will be 1 in a mirrored configuration) that can satisfy the request. The network component will forward the incoming write request to all replicas in a replica set, and the issuing consumer device will consider the write as complete when a configured number of replicas acknowledge the write. The configured number may be a predetermined number set by an administrator or a static or dynamic value that is a function of the required level of security or redundancy that may be required to meet one or more operational objectives. The network component may also provide some amount of PCI-attached high speed flash for to buffer writes under bursts of high load, when the write set for the operation is unable to meet latency or throughput targets.

In some aspects, the subject matter disclosed herein provides methods for efficiently replicating write requests. Storage systems may be required, in some cases, to trade off conflicting desires to maintain high performance, ensure durability of data in the face of failure, and avoid wasting any more memory than is necessary. These goals are complicated by the fact that workload is a dominant contributor to actual system performance: a storage system design that is good for one workload may be pessimal or at least sub-optimal for another. Known storage implementations frequently make use of variants of the Redundant Array of Inexpensive Disk (RAID) standards. RAID describes a number of approaches to storing data across a collection of disks, including mirroring (RAID1), striping (RAID0), striping with parity (RAIDS), and striping mirrored copies (RAID10). Related to the RAID standards, other systems have made use of forward error correcting codes, in particular the class of the algorithms commonly called "erasure codes" to allow an encoding of a piece of data into n parts, such that the recovery of any k of n (where k<=n) parts is sufficient to reconstruct the original data. In some distributed storage systems, erasure codes have been used to overcome the more static assignment of data to physical locations that is characteristic of RAID. Erasure coded systems achieve resilience to failure in their coding up front, and have more freedom to place data in response to available capacity and system load. Unfortunately, erasure coding (and parity based RAID) also demand that data be analyzed and transformed as it is accessed. This is a significant limitation on modern storage hardware, because any such transformations add latency to request processing. It is preferable to modify (or even copy) data as little as possible between applications that use it and the devices that store it.

Some aspects disclosed herein utilize an approach to replicating and placing data that is used in systems described herein that provide similar benefits as RAID and FEC-based protocols, but without coding data in flight. Instead, the instantly disclosed systems and methods take advantage of low-latency logic on the network component to allow reads and writes to be forwarded appropriately. With regard to writes, this means dynamically selecting a set of memory resources that satisfies a specified level of replication, and provides the best possible performance. In the case of reads, this involves remembering where the most recent version of a given piece of data has been written, and selecting the best (fastest, least loaded, or other criteria including minimizing power consumption) network component from that set.

In aspects, a replica set may be larger than the number of replicas that are requested for a given object. As such, given a replica set of size n, the system is parameterized for f<n, such that the failure of up to f memory resources may be tolerated. f, which is a function of the failure tolerance threshold, determines the number of replicas required within a replica set of size n in order to ensure that data is never lost. For example, in a set of size n=3, setting f=1 indicates that all data must be written to memory resource replicas; a failure of any single memory resource will still be tolerated with all data lost from that host being replicated on one of the other two. Setting f=3 demands that all data be replicated to all three memory resources, as according to that failure tolerance threshold, the system must survive the failure of all but one replica. In general, the number of replicas to be written, r, must always be at least f+1 (where f+1<=n). Aspects of the system described herein may allow for the mitigation of loads involved in writing large numbers of replicas by achieving some base level of replication (e.g. 2 replicas) and then deferring additional replica writes to some (bounded, short-term) point in the future. A benefit to considering this problem in terms of f/n failure tolerance is that a network interconnect-based system is free to place replicas dynamically on any r hosts within the n-host replica set. This approach to placement has similar characteristics to erasure coding in terms of managing risk through the selection of (kin codings), however, by specifically characterizing f and n, more direct information about the failures to be tolerated and the domain within which those failures may occur; in other words, n helps characterize the exposure to risk in the system.

In some aspects, an approach for forwarding and placing writes is provided. A network component with a replica set of n memory resources will maintain a set of replica stripes. Each stripe is a collection of r hosts belonging to the replica set. A write request arriving at the network component will be dispatched dynamically, to a single replica stripe. While a complete set of (n choose r) replica stripes is possible, it is typically easier to use a smaller number. Some aspects may use a "chain" of overlapping sets, each offset by a single memory resource. For r=2, n=3 this chained set is ((0,1), (1,2), (2,0)). For r=3, n=5, this is ((0,1,2), (1,2,3), (2,3,4), (3,4,0), (4,0,1)). Other approaches to building replica stripes are possible and reasonable.

In some aspects, the network component tracks the current availability of each replica stripe to serve write requests with maximal performance. It provides the write path with an ordered schedule of stripes that should service new requests. This ordered schedule is based on factors such as the current load (both from other writes and from read traffic) issued against that stripe, available capacity on the storage devices on that stripe, past performance, and known background activity that may contribute to storage performance, or other operational characteristics of memory resources (or, indeed, of the consumer device, the network, the network component, and the data or data object). Note that for many of these criteria, the schedule is influenced by the worst performing memory resource within each replica stripe—indeed, a key purpose in approaches disclosed herein is to pass requests to memory resources that are behaving well and avoid hosts that are failed, overloaded, or otherwise performing poorly. This approach aims to ensure that the forwarded request will complete as quickly and efficiently as possible given the management and configuration constraints of the system.

In aspects, the network component effectively converts a unicast write (i.e. a single write request that is not part of a set of replicas), received by the writing memory resource, into a multicast write to all or some the members of the replica stripe. Multicast in this case does not mandate IP or Ethernet multicast implementations, but rather that the arriving message is forwarded to all members of the selected stripe. Request completions may be held on the switch until all replicas in the stripe acknowledge completion. Alternatively, acknowledgements may be passed back to the writing memory resource, and tracked there. In this latter sense, writes are a combination of the networking concepts of anycast and multicast: The memory resource desires to have the write stored on all members of any single replica stripe.

In some aspects, an approach for forwarding read requests is provided. Reads arrive on the network component addressed for a specific piece of data and must be forwarded to a memory resource in the replica stripe that the data was last written to. In some aspects, the network component maintains a fast-path forwarding table within the mapping resource to map recently accessed data addresses to their associated replica set. In this aspect, other data mappings may be maintained on a slightly slower path and stored in memory on a server that is co-located with the network component or mapping resource (but may also be implemented on the memory of the mapping resource). In all cases, the network component will attempt to forward a read request to the replica set member that is capable of serving it with the lowest latency, while attempting to avoid disrupting other request traffic.

In some aspects, end system software for memory resources is utilized. As mentioned previously in this document, storage lives on end systems (i.e. memory resources) connected to the network component. Aspects herein have installed on thereon software that responds to memory requests that are forwarded from the network component as "micro-arrays" or virtualized "network attached disks" (NADs). The software stack used to manage these memory resources is described in a previously filed provisional patent, U.S. Patent Application No. 61/610,691, filed on Mar. 14, 2012, which is incorporated herein by reference. A log-structured file system is disclosed that virtualizes the address space of underlying storage devices and allows them to be accessed in an efficient, durable, and high performance manner. Any of the virtualized memory resources may operate, from the perspective of the network component and/or the consumer device, in the same manner as any other form of physical memory resource.

Aspects that perform write balancing are provided, including the following. The network component has access to all memory requests and is therefore positioned to balance write loads; the network component is configured in some aspects to be responsible for allocation of responsible memory resources and then associating data to locations in such memory resources by maintaining corresponding associations in the mapping resource. For example, when a write arrives at the network component, it will send it to the least-loaded memory resource, potentially in a round-robin manner. It will in some aspects maintain the mapping of logical address (i.e. data address) to physical address (i.e. information relating to a storage location) as part of an in-memory tree. This mapping will also be stored in the log write itself, allowing consistency to be restored in the event that the network component crashes. To recover from such a crash, the network component must have an accurate list of memory resources involved in the storage system. The network component may in some aspects be configured to flush switch-level mappings (i.e. obtain look-up table on other conventional network switches on the network or on the network switch of the network component itself).

Since data may need to be available even if the memory resource on which it resides fails or becomes overloaded, the network component itself should do fairly simple forwarding and certainly should not be involved in coding of data, particularly depending on the operational characteristics of the available memory resources; for example, on flash memory, erasure coding schemes may be inefficient, so it is more efficient to just store replicas and maintain the multiple mappings in the mapping resource and allow the mapping resource to provide routing information for the network switch of the network component. At the least, the network component can help with replication by avoiding sending duplicate copies from memory resource to network component on the write path. The network component can duplicate the message and send it out appropriately at that point by, for example, multicast (i.e. a single write request that is part of a set of replicas). Other examples include the use of extensibility on the network component itself if multicast fails to work as desired.

When writing, consumer devices may write into an object address space (i.e. data address) as described above. If replication should be provided, the network component may maintain replication groups as single storage location addresses. These destinations may in fact be IPv4/IPv6 multicast groups. The network component can do fork/join replication here: a write comes in, it is dispatched to all members of the replica group as part of the forwarding rules (i.e. routing scheme). An entry representing the unacknowledged request is added to an outstanding request list. This list is used to return acknowledgements to the writer only when all replicas have completed. To avoid large amounts of outstanding state, this can be implemented as a statically sized, per-port list on the network component's incoming port that is assigned to the consumer device or devices that are sending the write requests that must be maintained on such a list. If outstanding slots are overwritten, they can be failed back to the sender (i.e. consumer device) or, in some aspects, as a timeout. Requests can have a nonce to avoid late, expired completions from overwriting slots that have been reused.

Figure 3:
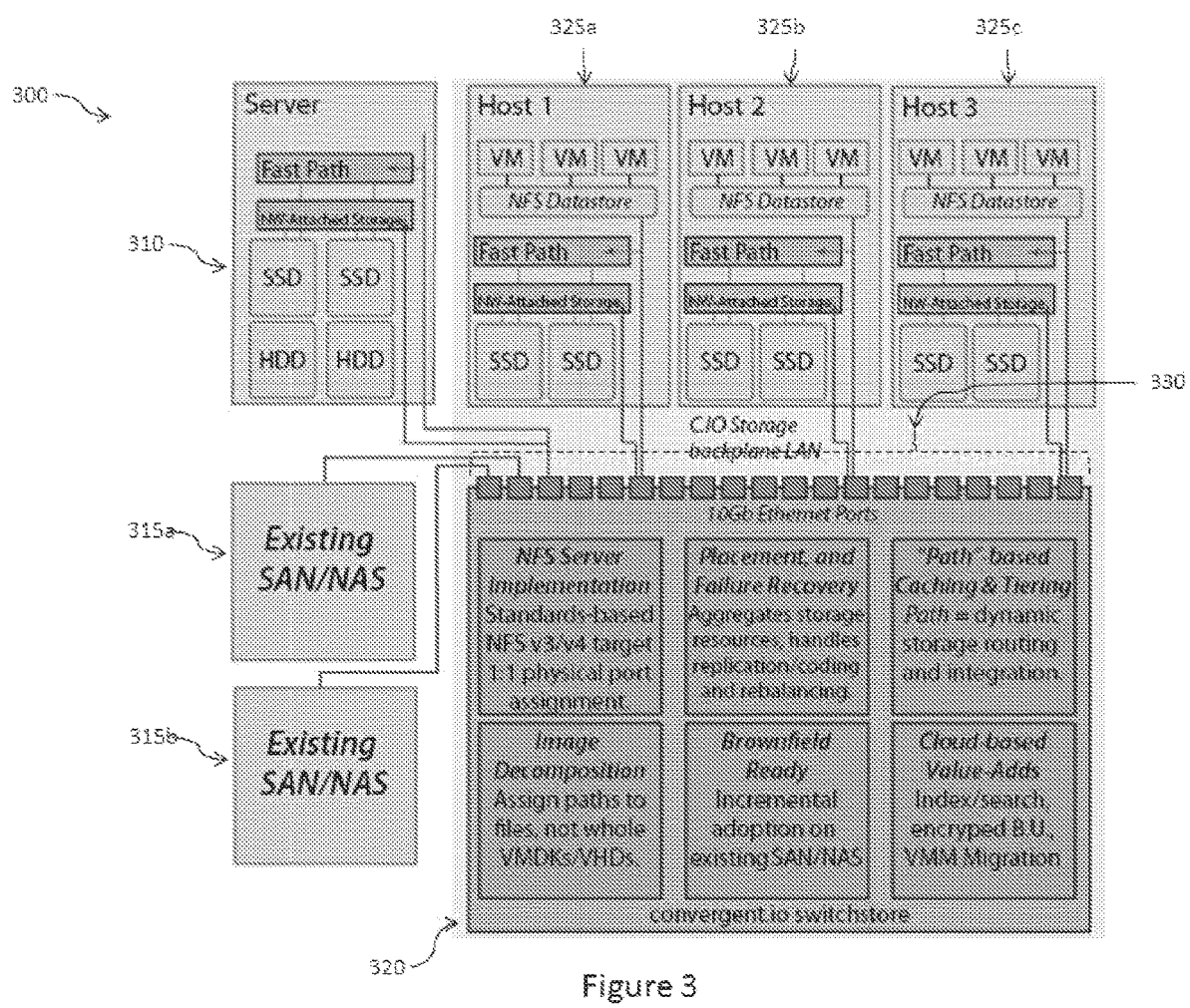
FIG. 3 shows one aspect of a device disclosed herein.

Referring to FIG. 3, there is shown an exemplary aspect of a network component 320 of the instant disclosure, as well as various examples of memory devices communicatively coupled thereto 310, 315a, 315b, 315c, 325a, 325b, 325c. As depicted, the network component 320 can provide for scalable memory resource expansion by the addition of discrete memory resources, or groups thereof, into external communications ports 330 of the network device 320. In the exemplary system shown 300, there are shown existing storage area networks/network attached storage (SAN/NAS) 315a, 315b. There is also shown an attached server 310, comprising a fast path (which may be an internal lookup table for responding to memory requests both originating and responsive from the server). The server may also comprise of various network attached storage units, such as SSD or HDD (solid-state drive or hard disk drives) that can serve as memory resources available to the network component. Also shown are attached memory resources, Host 1 325a, Host 2, 325b and Host 3 325c. Each host comprises a fast path connection, network attached storage comprising physical storage devices, as well as appliances to have running thereon virtual memory resources. The virtual memory resources may, via a hypervisor on the hosts (not shown) use physical memory resources that exist on the distributed memory resources coupled to the network component 320, a subset thereof, or other communicatively coupled memory resources. The network component 320 may, in aspects, view the virtual memory resources available to it as physical resources; in other words, the network component is "ignorant" to whether the memory resource is virtual or physical.

Figure 4:
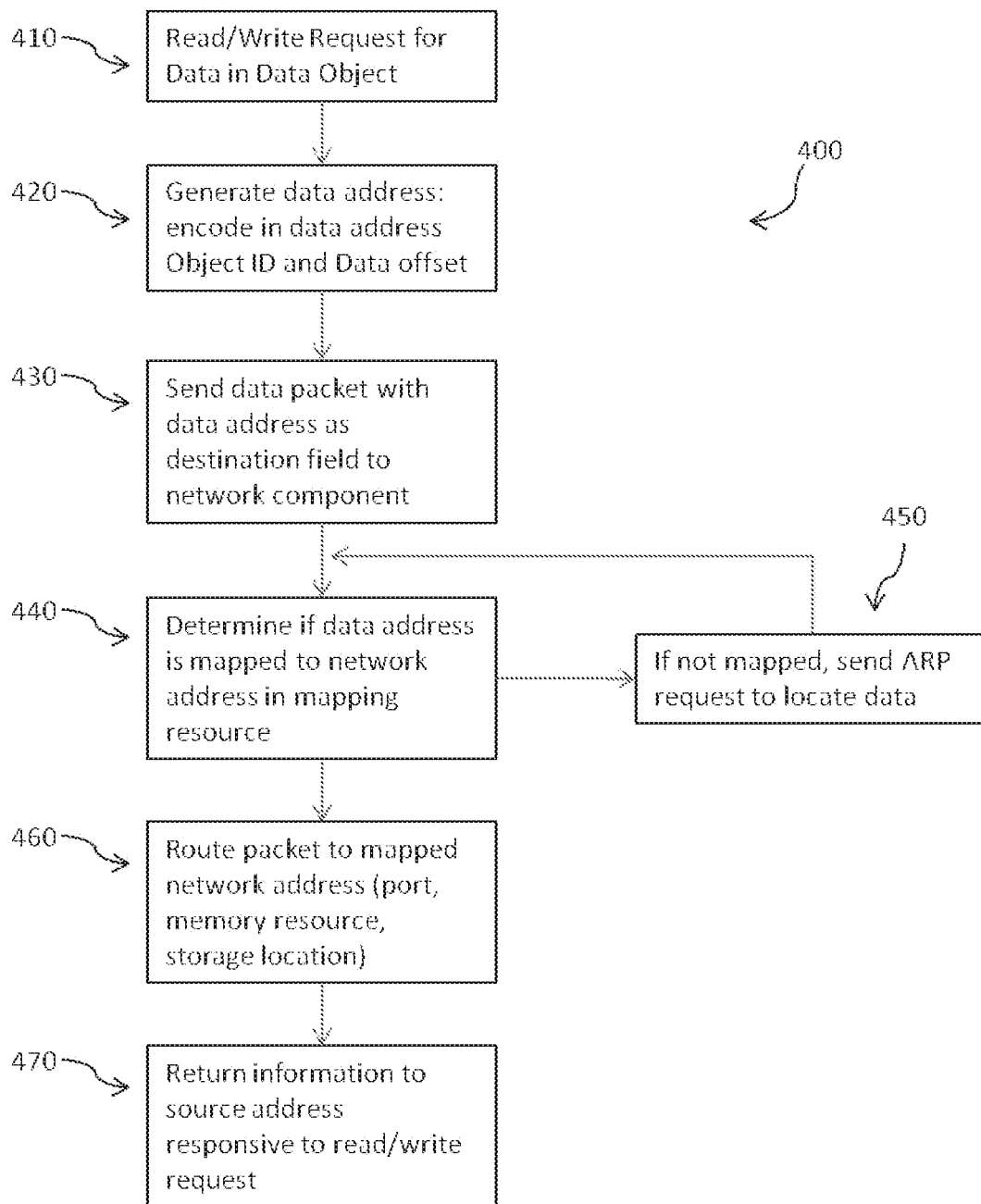
FIG. 4 shows one aspect of an exemplary method disclosed herein.

With reference to FIG. 4, there is shown an exemplary method for making memory requests 400 by a consumer device. At step 410, a consumer device makes a memory request as one of a read, write or update. At step 420, the consumer device then generates a data address and encodes information relating to the subject piece of data and places that in the data address (in some aspects, the data-identifying information may form the entirety of the data address). While this step shows the data-identifying information as being a concatenation of object ID and data offset, any information that can identify the data according to a convention can be used. Moreover, the mode of encoding may be different; any process of changing the data-identifying information into a format that can placed into a data address that can be recognized by the network component and, in some aspects, the memory resources, may be used. At step 430, the requesting consumer device (i.e. client) sends a data packet having the data address in the destination field to the network component; in some aspects, although not shown, the consumer device may write to (or read from) local storage depending on operational characteristics (e.g. request queues at the local storage are within limits that will allow memory requests to meet operational objectives). At step 440, the network component receives the data packet; the mapping resource assesses where to route the data packet by determining if the data address is associated with a storage location (whether by direct association for the unique address, or by associating certain ranges to specific memory resources or in accordance with a routing scheme). If there is no information for that data address in the network resource, at step 450 an address resolution protocol request is made to determine where the data packet should or can be forwarded (which may include many destinations for a multicast or other replication methodology). Once the destination of the packet (or destinations, in the case of replicas) has been determined and the data packet has been forwarded in accordance therewith, the information is mapped in the mapping resource. At step 460, the network resource routes the data to the appropriate storage location (including whether this a port on which multiple memory resources reside, a specific memory resource, a specific device (virtual or physical) on a memory resource, or a specific location within a device on a memory resource). At step 470, the memory resource returns the requested data (for a read) or an acknowledgement (for a write or an update) to the source address of the consumer device.

Examples

In one aspect, the hardware utilized includes the following dense, high-performance storage technologies: (a) PCIe Flash SSD (e.g. Intel 910) having 800 GB, Random 4K at 70K TOPS Sequential Read at 200K IOPS; (b) Microserver Chassis (e.g. Quanta STRATOS 5900-X31A) 24 Servers in 3RU PCIe flash device and 10 Gb NIC; and (c) 10 Gb SDN Switch (e.g. Arista 7050T) 48 port (stackable) full-mesh. Aspects described herein may be based on a (still very dense) modular 2 u server enclosure that allows four flash devices as independent modules, each with their own CPU and 10 Gb NIC.

FIG. 5 illustrates an exemplary NAD-based design utilized in aspects of the subject matter disclosed herein. Achieving improved storage performance over a wide variety of workloads, clients should have some degree of control over the work done to service those requests. The final destination of most of those requests is physical storage. Since the physical layer presents the common API for all users of the system, it should be a minimal API, making as few assumptions as possible about the users of the resource. However, aspects of the devices disclosed herein need to provide enough service to allow independent consuming devices to share the resource effectively (i.e., without wasting space, or performing extra work to coordinate). There are several ways to share a physical device. The simplest is to statically partition it, but this approach is cumbersome when the storage requirements of the device's users are not known in advance. Approaches disclosed herein seeks to virtualize the disk, assigning individual clients sparse address spaces of 264 bytes, whose mappings to physical ranges are managed by the device layer. In addition to providing the basis for isolated and reasonably low-level device access, this approach may in some aspects allow the device to assign physical storage to clients dynamically, without client coordination. Capacity issues still need to be managed as a system-wide responsibility, but presenting sparse address spaces and allowing the NAD to handle allocations and mappings optimizes for the common case of multiple clients whose capacity needs are difficult to estimate a priori. Some approaches disclosed herein may also provide a simple and narrow network-facing device interface lets the device choose the optimal storage, based on the physical media and capabilities of the controlling hardware.

An exemplary NAD object interface, summarized in FIG. 3, can be thought of as a hardware abstraction interface for network-connected storage: It is simpler than other block device interfaces, such as the SCSI command set, but is also more direct and general purpose than even narrower interfaces such as those of a key-value store. Providing a low-level hardware abstraction layer allows the NAD implementation to be customized to accommodate best practices of individual flash implementations, and also allows more dramatic design changes at the media interface level as new technologies become available. The storage address spaces that some NADs may present can be made available to clients in an isolated manner by tightly coupling them with managed Ethernet switches. Address spaces contain attribute fields that permit them to be associated with specific clients from an access control perspective. The system then allows network isolation primitives, in some aspects it supports both VLANs and an OpenFlow-based connection management library, although others known to persons skilled in the art may be utilized, to wire and enforce object-to-principal mappings. NADs may in some aspects share a private virtual network for peer-wise resynchronization traffic, in order to allow fast failure response.

Aspects of the instantly disclosed subject matter may utilize the performance characteristics of fast storage memories that lend themselves to a dispatch-oriented programming model in which a pipeline of operations is performed on requests as they are passed from an originating client (i.e. a consuming device), through a set of transformations, and eventually to the appropriate storage device(s). Similarity to packet processing systems such as X-Kernel, Scout, and Click may be utilized, but are adapted to a storage context, in which modules along the pipeline perform translations through a set of layered address spaces, and may fork and/or collect requests and responses as they are passed. Composable dispatch implementation is structured as a library that may either be used to construct network storage protocol implementations as servers, or be linked directly into OS or application code. For example, it can provide an NFS interface to shared storage for conventional machines, while simultaneously exposing a low-level key/value interface for more specialized applications. NAD implementation in disclosed aspects may isolate these consumers from one another, while the modular dispatch library allows reuse of common translations to achieve functionalities such as replication and striping. Instantiations of set of library-based storage components may be described as a storage path. In some aspects, a storage path may be considered as a pipeline of single-purpose storage request processors. Each processor in such aspects takes a storage request (e.g., a read or write request) as input from its predecessor, and produces one or more requests to its children. Processors are used to express mappings between address spaces. NADs may expose isolated objects, which are sparse address spaces that describe some stored data; processors perform translations that allow multiple objects to be combined for some functional purpose, and present them as a single object, which may in turn be used by other processors.

Data requests are generally acknowledged at the point that they reach a storage device, and so as a result they differ from packet forwarding logic in that they travel both down and then back up through a storage path; processors contain logic to handle both requests and responses. Data requests may also be split or merged as they traverse a processor. For example a replication processor may duplicate a request and issue it to multiple nodes, and then collect all responses before passing a single response back up to its parent. Finally, while processors describe fast, library-based request dispatching logic, they may also utilize additional facilities from the system. Disclosed aspects may allow processor implementations access to APIs for shared, cluster-wide states which may be used on a control path to, for instance, store replica configuration. It may additionally provide facilities for background functionality such as NAD failure detection and response. The intention of the processor organization is to allow dispatch decisions to be pushed out to client implementations and be made with minimal performance impact, while still benefiting from common system-wide infrastructure for maintaining the system and responding to failures.

Some aspects comprise a replication process 710, which allows a request to be split and issued concurrently to a set of replica objects. The request address remains unchanged within each object, and responses are collected until all replicas have acknowledged a request as complete. Reads are passed to the first replica, and in the event of a failure (either an error response or a timeout) they are passed to the next replica. The processor may be parameterized to allow arbitrarily many replicas to be configured. Note that more complex implementations of replication are certainly possible, for instance by issuing reads to all replicas and cross-checking results or round-robin dispatch of reads to balance load among replicas. The replication implementation described above is relatively more simple, and is also what we use in the current system. Also note that the replication processor may not in some aspects contain specific logic for failure recovery. This logic, which is described below, may be handled by a processor component that lies outside the dispatch library.

As exemplified in FIG. 7, striping 715 allows data to be divided and distributed across a collection of sparse objects. The processor is parameterized to take a stripe size (in bytes) and a list of objects to act as the ordered stripe set. In the event that a request crosses a stripe boundary, the processor splits that request into a set of per-stripe requests and issues those asynchronously, collecting the responses before returning. Static, address-based striping is a relatively simple load balancing and data distribution mechanism. Data placement tends to be reasonably uniform within an object address space and a reasonable stripe size (e.g. 64 KB) generally preserves sufficient locality as to avoid unnecessarily splitting requests.

Figures 8, 9:
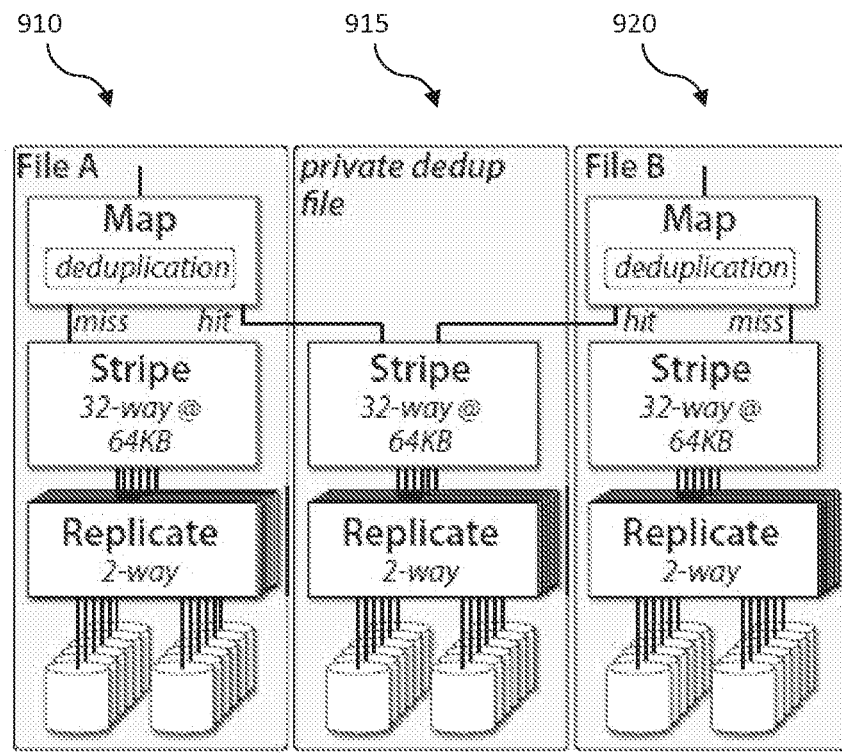
FIG. 8 shows an exemplary dynamic mapping interface.
FIG. 9 shows exemplary path configuration for data requests.

Another example processor is that of dynamic mapping, shown in exemplary form in FIG. 7 as Mapping 720, which allows arbitrary actions to be mapped onto address ranges within an object. The dynamic mapping processor in some aspects may be similar to page table-style management of virtual memory in an operating system: it can use a tree structure to associate actions with object address ranges, and then passes requests to the appropriate destinations based on these actions. Mappings have proven to be very useful in the system because they allow for extensibility by implementing a set of storage features, including de-duplication, hotspot mitigation, and object snapshots, as independent modules that interact with objects through their mapping interface. FIG. 8 shows an exemplary mapping processor interface. An object's mappings are implemented using a b-tree that maps byte ranges of an object address space to actions. De-duplication, for instance, may indicate that a range of object data maps to an associated range of a separate shared, read-only object that contains de-duplicated data.

In some aspects, object maps are backed by normal striped, replicated mapping files. Consuming devices read the file maps themselves, caching whatever parts of the b-tree they access in memory while the object is open, and use a synchronization RPC service to coordinate changes to the maps of open files. The synchronization service may provide transactional map updates, accepting a set of update requests and applying them to the map file atomically through a two-phase commit protocol with all the clients that have the map open. In a preparation phase, consuming devices wait for any outstanding IO to the affected ranges to complete, and block incoming IO to those ranges until the transaction has committed. If all the clients acknowledge the preparation request, the transaction is committed, otherwise it is aborted. Committing the transaction invalidates the affected regions of the map in the client-side cache, causing the updates to be fetched if and when the client next accesses that region of the object. The physical b-tree updates are performed by the RPC service (relying on object snapshots to make the file update atomic). Transactions may optionally use a form of optimistic concurrency control: consuming devices that update the map can register watches on regions of the object. If any of the watched regions have been modified, the transaction will be aborted by the client that performed the modification when an update commit is attempted. The de-duplication service uses this feature to safely remap data in live objects without having to lock IO to the regions it is de-duplicating, minimizing interference with end-user workloads.

Storage paths may be connected sets of processors that provide a top-level dispatch entry point for requests to be issued to. FIG. 9 shows an example configuration of paths for two top-level files, and a shared internal de-duplication object that stores common data between the two. The de-duplication file may be a system-wide facility that would generally be shared by a large number of objects. As every processor in the system presents an address space and may dispatch requests to connected address spaces belonging to other processors, and then eventually objects that are exported by NADs, every processor instance may be treated as an object. Some aspects maintain a private namespace in a Zookeeper-based repository of clusterwide state. This namespace contains an entry for each object, indexed by an opaque object ID (OD). OID entries in this shared store point to a structure that describes the type of processor and includes parameters for that specific processor instance. When a consuming device opens a file for access, they instantiate a dispatcher instance that starts with the top-level processor OID, and traverses the directed graph of processors that are transitively referenced by it. As an example, in FIG. 9, if files A 910 and B 920 are both being exported by the NFS target, the NFS server namespace will encode a mapping between/path/A and the OID of the mapping processor that is at the top of A's dispatch graph. When an NFS consuming device accesses file A it will use this OID to instantiate a dispatch state machine to issue requests to that object. This dispatcher instantiation is similar in some regards to Exokernel's use of "library OSes" in that it contains the specific functionality that is required for a storage client to interact directly with a collection of devices and uses no intermediary on the data path. The cluster namespace associated with the exemplary aspect of FIG. 9 is used only for control-path operations that are performance insensitive. While the number of OID records per top-level object may seem inefficient, it has proven to be an effective design decision: OID records are small and accessed very infrequently, and resulting instantiated dispatch logic is a small in-memory structure that is similar in nature to packet classification and forwarding systems. Using per-processor-type OID records allows background tasks for activities like failure recovery to query for the specific objects that require attention when the system's state changes.

Allowing consuming devices direct access to storage devices may complicate system reconfiguration tasks that need to be performed in response the failure of devices or the addition of new hardware. Aspects of the instantly disclosed subject matter therefore must handle reconfigurations in a manner that interferes with client workloads as little as possible, and must be able to reconfigure client dispatch instances safely and efficiently. The system achieves reconfiguration through a set of mechanisms: First, as NADs are well-balanced network, compute, and storage pairings, they tend to have slack computing resources when the system is not running at peak load. Aspects disclosed herein provide a background job scheduling framework in which tasks may be registered in a work queue that is held in cluster-wide state, and then scheduled for execution on one or more NADs as resources become available. Second, the system may have a physical state monitoring service that generates events in response to physical failures and hardware warnings, such as SMART reporting from flash devices. Third, processor-specific backend logic can run on the NADs and react to environmental changes in the system. These processor backends register for relevant change requests, are able to issue queries against system's set of OID records, and can then queue background tasks to reconfigure the system. Tasks often begin with a data movement operation, for instance rebuilding a lost replica on a new NAD. When the requested data movement is complete, they update relevant records in the ODI namespace to "wire in" the configuration change. Finally, they use a notification mechanism to request that clients reload the dispatch graphs for affected objects. It is worth noting that the task and cluster state logic is very separate from the NAD-based object interface that we discussed at the start of this section. The computing resources on the individual NADs may aggregate to form what can effectively be considered a hosting environment for the higher-level cluster management and background storage services that the system uses to manage them. These services may be control-path facilities that are completely isolated from the client/NAD request path. Multiple sets of network interactions may run on independent VLANs.

In aspects, it may be determined that a NAD has failed in response to either a reported hardware failure from a responsive NAD (such as a failed flash device) or a NAD that stops responding to requests for more than a configurable timeout (currently one minute). At this point, the replication processor backend may be configured to execute, and is responsible for recovering the data redundancy that was lost with the failing NAD. FIG. 10 summarizes the rebuild logic that runs in the event of a NAD failure. Note that the first thing that the response logic does is to disconnect the failing NAD from the data path VLAN. In some aspects, this occurs due to integration directly against an Ethernet switch: prior to taking corrective action, the NAD is synchronously disconnected from the network for all request traffic, avoiding the distributed systems complexities that stem from things such as overloaded components appearing to fail and then returning long after a timeout in an inconsistent state. Rather than attempting to use completely end-host mechanisms such as watchdogs to trigger reboots, or agreement protocols to inform all clients of a node's failure, disclosed aspects may disable the VLAN and require that the failed NAD reconnect on the (separate) control VLAN in the event that it returns to life in the future. From this point, the logic is straight forward. The set of replication-typed OID records are queried for all replicas that are configured to use the failing NAD as one of their targets. The system then identifies a new NAD, considering topology information to avoid placing replicas on fate-sharing hardware. The failing target is removed from that OID record, and a task is spawned to generate a new replica by syncing from one of the existing, still functional replicas. This sync request is a NAD-to-NAD operation and is part of the NAD interfaces described above. When synchronization completes, the new target is added to the replication OID record and a notification is sent to request that any active dispatchers that are using that OID reload the dispatch graph. On noticing the change in configuration, the replication dispatch at the consuming device ensures that the replicas are completely synchronized in case there were in-flight writes after the point at which the task-requested sync completed.

Similar to rebuilding lost data after a failure, a striping process backend responds to the addition of new hardware by migrating stripes onto new NADs as they are attached. The striping module 715 shown in FIG. 7 can be (and typically is) configured to provide a RAID-10-like storage arrangement by having each stripe file making up an object be supplied by the replication module. When this configuration is active, the stripe files for an object can be moved to another node even while the file is online, as follows: 1. Add new replicas for the stripes to be migrated, on the NADs to which they should be migrated. 2. Wait for the replicas to synchronize and become available. 3. Remove the replicas from the NADs that should no longer host the stripe data. A background task can rebalance the entire cluster by choosing a new target placement for all of the replicas and migrating by configuring the replica module for each file using the straightforward algorithm above. Stripe migration may allow (1) aspects of the system to more evenly distribute load across available hardware resources, achieving a better balance of workload; and (2) requests from a single client to be distributed across a larger number of device queues.

De-duplication may be considered as a enterprise storage feature where regions of coincidentally identical data in different objects or offsets are stored just once. This feature can result in dramatic capacity savings for backup systems but is also valuable when it can extend the capacity of non-volatile memory, which has a relatively high per-GB cost. Aspects of the instantly disclosed subject matter uses a hybrid approach to de-duplication; in which the memory and CPU intensive de-duplication process is done out-of-band, but is driven by lightweight hints that are calculated on the write path in order to minimize the overall I/O load on the system. De-duplication hints are stored in a file with a header specifying the object address, then a series of tuples containing a lightweight 32*b* hash, the region size, and the object offset. Aspects disclosed herein may use an extensibility interface to the write paths of our NFS server, wherein a background task such as de-duplication can register a small code module. An interface may be utilized to collect hints and to regularly write them to /.dedup/hints, a reserved path in the namespace.

Figure 12:
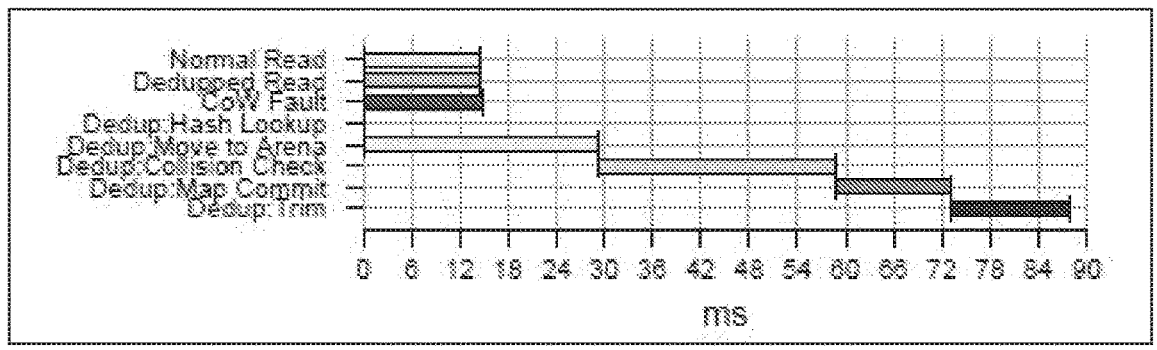
FIG. 12 shows exemplary effects of various implementations on components when conducting de-duplication.

In some aspects, there is disclosed a de-duplication engine that runs as a background task and consumes these hints. A pseudocode implementation of this loop is shown in FIG. 11. When it finds two or more identical hashes it reads each chunk of data to ensure that a hash collision has not occurred. If not, it copies the data into a de-duplication arena, and uses the map service to update client mappings, and to trim the de-duplicated data from the NADs that stored it. Flags are set on the maps to ensure that the shared data isn't overwritten. Periodically, a de-duplication GC process walks a back reference database and removes chunks from the arena that are no longer referenced by any object. Both the de-duplication engine and its GC are coordinated through a background job scheduling framework. FIG. 12 shows the results of a test run with a cluster NFS server in an 8-node configuration. The first entry is conventional non-de-duplicated access. Following that, a 4 k read of a de-duplicated chunk is shown, and then a CoW fault due to modifying a de-duplicated page. Finally, the major stages of the de-duplication process are shown. Generally, the random read performance of flash results in much lower de-duplication overheads that conventional disk-based systems. The bulk of the de-duplication loop consists of five random reads and sequential writes plus trim, which each complete in approximately 14.5 ms. There are opportunities to further tune this implementation with asynchronous I/o operations. Alternatively, inline dedup would add fewer I/O operations to the system, but would necessarily impact the entire datapath, whereas background dedup can be more effectively scheduled and disabled.

Disclosed aspects provide a mechanism for isolating network resources and connectivity between tenants that share common physical servers and switching. Some disclosed aspects utilize a managed network to enforce isolation between independent endpoints. In aspects, integration with both OpenFlow-based switches, and software switching at the VMM to ensure that data objects are only addressable by their authorized clients. Some implementation use Ethernet VLANs, based on the observation that this was a hardware-supported isolation approach that was in common use in enterprise environments. Additional implementations use OpenFlow, because it provided a more flexible tunneling abstraction for traffic isolation. In some aspects, the control path is initially mapped to clients at a preconfigured IP address. Consuming device connections to the control interface can be authenticated in one of two ways: either through a shared secret that is configured on each consuming device, or by storing a list of valid MAC addresses for consuming devices. End-to-end authentication to establish private connections to NADs can be used, which also incurs configuration overhead in managing individual client keys. The second option assumes that the environment is capable of enforcing unforgeable Ethernet MAC addresses, which is a reasonable assumption in enterprise environments, as MACs can be validated and enforced by VMMs or network hardware.

Figure 13:
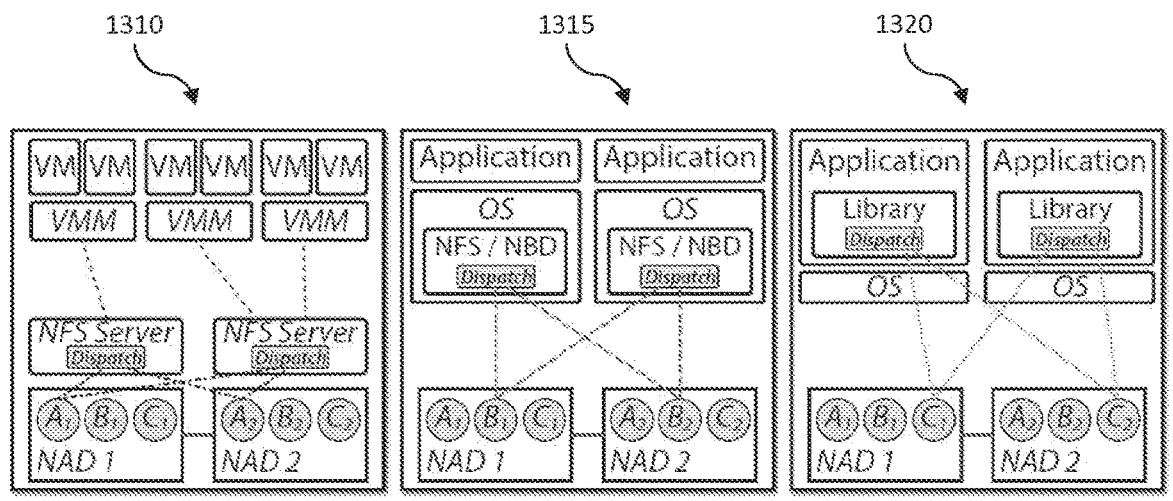
FIG. 13 shows exemplary dispatch implementations in various examples of consuming devices.

FIG. 13 shows three different and concurrent exemplary client configurations of the system 1310, 1315, 1320. In the first example 1310, a set of unmodified VMMs use their existing NFS client implementation to access storage over a co-hosted NFS server implementation that runs above the NADs on shared hardware. The second examples 1315 show the same dispatch code linked into an in-VMNFS or network block device driver. Finally, in the third example 1320, the dispatcher is linked directly to an application, which interacts with NADs directly over the network. The lines show the isolated virtual networks that are used to connect each client to its data. Note that there are two additional virtual networks that also serve to isolate traffic: NFS requests are placed on an independent VLAN, as are the backplane connections to provide resynchronization between NADs in the event of failure. A rewarding aspect of the design and implementation of aspects disclosed herein is that the resulting primitives have mapped very well into existing abstractions for virtualization and isolation of compute and network resources within enterprise environments.

In some aspects, an objective of one or more of the NADs is to give multiple consuming devices low-latency access to shared flash storage, through a sparse, byte addressable object interface to the higher layers. The objects are also versioned for synchronization: when a NAD is brought online, it may have out-of-date copies of replicated objects. The replication service needs to copy just the differences between the version already on the NAD and the current state. Some NAD implementations use a log-structured object store. Writes are written as self-describing records to a continuous log and then garbage-collected in large contiguous segments. Metadata is held in btrees, which are themselves written out to disk in a log. A log may be used so that both writes and deletion happen in contiguous chunks for good performance on flash memory. The garbage collector empties segments by copying any live data to the head of the log. It maintains the invariant that replaying the data log will always reproduce the correct object state, which is useful for debugging and error recovery. In order to handle write-heavy workloads, the garbage collector is multi-threaded so that it can clean more than one area at a time. The log structure gives good write performance: incoming writes can be acknowledged after a single write to flash, with metadata flushed asynchronously. Read performance is better than for log-structured systems on disk because there is no seek latency, but still requires a large in-memory cache of metadata btrees. Also, because a common workload in virtualized datacenters is random aligned reads and writes of about the same size as the underlying block size, such writes must be placed so that the data is aligned on block boundaries. Otherwise each block-sized read would need to read two blocks from disk. Versioning and synchronization is managed by sequence numbers. Every mite to an object increments its sequence number, and a second btree is maintained, tracking from sequence number to write record. An out-of-date replica can be brought back into sync by transferring only those write records which have a higher sequence number than the last one mitten at the destination. Because the garbage collector may have discarded intermediate state, this can only be used to resync to the current state, and not to any older state.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes. CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g. "C") or an object oriented language (e.g. "C++", "java", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although the invention has been described above by reference to certain aspects and examples of the invention, the invention is not limited to the aspects described above. Modifications and variations of the aspects described above will occur to those skilled in the art in light of the above teachings.

The invention claimed is:

1. A network switching interface, comprising:
   a plurality of network interface ports for interfacing, over a digital network, a plurality of digital data storage devices for storing data and one or more client devices that send data requests, each of said data requests relating to a portion of said data and comprising a data address associated with the distributed digital data system, wherein said data address comprises therein embedded information that identifies one or more data characteristics of said portion; and
   a switching device that routes a data request to the plurality of digital data storage devices associated in a forwarding table with a given data address of said given data request, wherein the network switching interface employs congestion monitoring methodology, by having the switching interface monitor latency statistics of the network interface ports, and invalidates forwarding table entries that point to congested ports and adds new forwarding table entries for further associating of the data address with a digital data storage device;
   wherein said data is remapped in said forwarding table such that at least one said data address is remapped from an association with a first one of said digital data storage devices to a second one of said digital data storage devices based on said one or more data characteristics.

2. The network switching interface of claim 1, wherein the embedded information in the data address identifies at least one of said data characteristics of said portion based on an encoding convention.

3. The network switching interface of claim 2, wherein the embedded information is embedded in the data address in accordance with an embedding convention.

4. The network switching interface of claim 1, wherein the data address is an IP address.

5. The network switching interface of claim 4, wherein the IP address is selected from one of the following group: an IPv4 address and an IPv6 address.

6. The network switching interface of claim 1, wherein the data address is an Ethernet address.

7. The network switching interface of claim 1, wherein a physical mapping database is further configured to dynamically generate associations between data addresses and information relating to storage locations in the plurality of digital data storage devices.

8. The network switching interface of claim 7, wherein a generation of mappings is in accordance with a routing methodology.

9. The network switching interface of claim 8, wherein the routing methodology is based one of the following: a prefix of the data address, a portion of the data address, a static mapping, striping, hash function, round-robin assignment, assessment of operational characteristics, and a combination thereof.

10. The network switching interface of claim 1, wherein the data is remapped due to a redistribution of the data amongst the plurality of digital data storage devices.

11. The network switching interface of claim 1, wherein a given data remapping causes a redistribution of the data amongst the plurality of digital data storage devices based on the given data remapping.

12. The network switching interface of claim 1, wherein the data corresponding to the at least one remapped data address is stored on at least the second one of the digital data storage devices prior to having been remapped.

13. The network switching interface of claim 1, wherein the second one of the digital data storage devices has at least one first operational characteristic different from a corresponding operational characteristic of the first one of digital data storage devices.

14. The network switching interface of claim 13, wherein the at least one remapped data address is selectively remapped to the second one of the digital data storage devices based on at least one of the one or more data characteristics.

15. The network switching interface of claim 13, wherein the at least one remapped data address is selectively remapped to the second one of the digital data storage devices based on said difference.

16. The network switching interface of claim 1, wherein the one or more characteristics comprises at least one of: a position of said portion in the data and an identifier of the data.

17. The network switching interface of claim 1, wherein the one or more characteristics comprises at least one of: an operational characteristic of the data, a user of the data, a use of the data, and a type of the data.

18. The network switching interface of claim 1, wherein a data remapping causes a redistribution of data amongst the plurality of digital data storage devices based on said data remapping.

19. A distributed digital data system, comprising:
    a network switching interface comprising a plurality of network interface ports for interfacing, via network communication, a plurality of digital data storage devices for storing said data and one or more client devices that send data requests relating to said data, wherein the network switching interface employs congestion monitoring methodology, by having the switching interface monitor latency statistics of the network interface ports, and invalidates forwarding table entries that point to congested ports and adds new forwarding table entries for further associating of the data address with a digital data storage device;
    at least one client device comprising a client data processor and a stored set of instructions that, when executed:
    associate a given data address from a range of data addresses associated with said distributed digital data storage system with a given portion of data, wherein said given data address comprises therein embedded information identifying one or more characteristics of said given portion of said data; and
    send data requests relating to said given portion of the data with the given data address associated therewith; and
    wherein said data is remapped in a forwarding table amongst storage locations in at least one of a digital data storage device based on said one or more characteristics of said given portion.

20. A method for storing data across distributed digital data storage devices over a digital network, the method comprising:
    generating for a portion of data a data address from a range of addresses associated with the distributed digital memory resources, the data address comprising therein embedded information that identifies one or more characteristics of said portion;

sending data requests relating to the portion of data over the digital network to a digital network switching interface using said data address, said digital network switching interface comprising a physical mapping database and plurality of network interface ports, said physical mapping database comprising access to a forwarding table stored on accessible physical memory, wherein the digital network switching interface employs congestion monitoring methodology, by having the switching interface monitor latency statistics of the network interface ports, and invalidates forwarding table entries that point to congested ports and adds new forwarding table entries for further associating of the data address with a digital data storage device;

receiving a data request at the digital network switching interface and checking to see if the data address has been associated in the forwarding table with information relating to a storage location in the distributed digital data storage devices communicatively coupled to the digital network switching interface; and remapping the association between a given data address and the corresponding information relating to a given storage location in the forwarding table based on said one or more characteristics data.

* * * * *